(12) United States Patent
Furlan

(10) Patent No.: US 12,263,590 B2
(45) Date of Patent: Apr. 1, 2025

(54) MACHINE VISION PARSING OF THREE-DIMENSIONAL ENVIRONMENTS EMPLOYING NEURAL NETWORKS

(71) Applicant: Sanctuary Cognitive Systems Corporation, Vancouver (CA)

(72) Inventor: Rodrigo Furlan, Delta (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 1151 days.

(21) Appl. No.: 17/061,187

(22) Filed: Oct. 1, 2020

(65) Prior Publication Data

US 2021/0122035 A1    Apr. 29, 2021

Related U.S. Application Data

(60) Provisional application No. 62/927,485, filed on Oct. 29, 2019.

(51) Int. Cl.
| | |
|---|---|
| *G06N 3/04* | (2023.01) |
| *B25J 9/16* | (2006.01) |
| *B25J 19/02* | (2006.01) |
| *G06N 3/045* | (2023.01) |
| *G06T 7/55* | (2017.01) |

(Continued)

(52) U.S. Cl.
CPC ............. *B25J 9/161* (2013.01); *B25J 9/1697* (2013.01); *B25J 19/023* (2013.01); *G06N 3/04* (2013.01); *G06N 3/045* (2023.01); *G06T 7/55* (2017.01); *G06T 7/75* (2017.01); *G06V 20/64* (2022.01)

(58) Field of Classification Search
CPC .. G06T 7/55; G06T 7/75; G06V 20/64; G06N 3/045; G06N 3/04
See application file for complete search history.

(56) References Cited

U.S. PATENT DOCUMENTS

| | | | |
|---|---|---|---|
| 9,015,093 B1 * | 4/2015 | Commons .......... | G01C 21/3602 706/26 |
| 2022/0147791 A1 * | 5/2022 | Yao ...................... | G06N 3/0495 |

OTHER PUBLICATIONS

Zhang et al. (Unsupervised Feature Learning for Point Cloud Understanding by Contrasting and Clustering Using Graph Convolutional Neural Networks, Aug. 2019, pp. 1-10) (Year: 2019).*

(Continued)

*Primary Examiner* — George Giroux
(74) *Attorney, Agent, or Firm* — Adenike Adebiyi; Thomas Mahon

(57) ABSTRACT

Machine vision apparatus, methods and articles advantageously employ neural networks to parse or evaluate a three-dimensional environment which may, for example, be useful in robotics. Such may advantageously allow detection of objects (e.g., targets, obstacles, or even portions of the robot itself or neighboring robots) in a three-dimensional environment using limited physical computational resources, limited processing time, and/or with a high level of accuracy. Detection may include representation of a volume occupied by an object in the three-dimensional environment and/or a pose (i.e., position and orientation) of the object in the three-dimensional environment. Such may, for example, allow a robot to engage or otherwise interact with one or more target objects while avoiding obstacles in the three-dimensional environment, for instance while the robot operates autonomously and/or in real-time in the three-dimensional environment.

16 Claims, 15 Drawing Sheets

(51) Int. Cl.
*G06T 7/73* (2017.01)
*G06V 20/64* (2022.01)

(56) References Cited

OTHER PUBLICATIONS

Chu et al. (Generative Adversarial Network-Based Method for Transforming Single RGB Image Into 3D Point Cloud, Jan. 2019, pp. 1021-1029) (Year: 2019).*
Henriques et al. (MapNet: An Allocentric Spatial Memory for Mapping Environments, Jun. 2018, pp. 8476-8484) (Year: 2018).*
Song et al. (Physically-Based Rendering for Indoor Scene Understanding Using Convolutional Neural Networks, Jul. 2017, pp. 1-9) (Year: 2017).*
Jaritz et al. (Multi-view PointNet for 3D Scene Understanding, Sep. 2019, pp. 1-10) (Year: 2019).*
Chang et al. (Matterport3D: Learning from RGB-D Data in Indoor Environments, Sep. 2017, pp. 1-25) (Year: 2017).*
Fan et al. (A Point Set Generation Network for 3D Object Reconstruction from a Single Image, Jul. 2017, pp. 2463-2471) (Year: 2017).*
Person et al. (Multimodal Fusion Object Detection System for Autonomous Vehicles, May 2019, pp. 1-9) (Year: 2019).*
Tian et al. (3D object recognition method with multiple feature extraction from LiDAR point clouds, Mar. 2019, pp. 4430-4442) (Year: 2019).*
Liu et al. (Temporal Signal Basis for Hierarchical Block Motion in Image Sequences, Jan. 2018, pp. 10-14) (Year: 2018).*
Lowe (Distinctive Image Features from Scale-Invariant Keypoints, Jan. 2004, pp. 1-28) (Year: 2004).*
Behl (PointFlowNet: Learning Representations for Rigid Motion Estimation from Point Clouds, Jan. 2019, pp. 1-34) (Year: 2019).*
Brostow (Segmentation and Recognition using Structure from Motion Point Clouds, Oct. 2008, pp. 1-15) (Year: 2008).*

\* cited by examiner

MACHINE VISION PARSING OF THREE-DIMENSIONAL ENVIRONMENTS EMPLOYING NEURAL NETWORKS

BACKGROUND

Technical Field

The present disclosure generally relates to machine vision, and more particularly machine vision apparatus, methods and articles that employ neural networks to parse or evaluate a three-dimensional environment which may, for example, be useful in robotics.

Description of the Related Art

Machine vision is employed in a large variety of applications to allow a processor-based system to perform various tasks. For example, machine vision may be employed to assess an environment in which a robot operates in order to identify objects including targets and obstacles in the environment, which may allow the robot to engage with targets while avoiding obstacles. Such robots may take the form of robots with one or more moveable robotic appendages, the robots being autonomous, remotely controlled by a human operator, or partially autonomous. Such robots may alternatively or additionally take the form of autonomous vehicles (e.g., autonomous automobiles, land-, air- or water-based drones).

Information can derive from a variety of sources, for example one or more imager or image capture devices (e.g., digital cameras, infrared cameras, two-dimensional cameras, three-dimensional cameras, stereo cameras, time-of-flight (TOF) cameras, range finder cameras, light field cameras), and/or one or more light detection and ranging (LIDAR) sensors, proximity sensors, or motion sensors. The collected information (e.g., three-dimensional point cloud) represents all or a portion of a three-dimensional environment, any typically requires processing to evaluate the environment to detect objects (e.g., targets, obstacles) in the environment. Many different approaches may be employed in processing the collected information, although these approaches may require significant computational resources, significant time, and/or may or may not result in highly reliable results.

Many applications place constraints on processing of collected information. For example, there may be limits on the computational power available to process the collected data and/or limits on the time available to process collected data (e.g., in a dynamic environment in which a robot, target and/or obstacles may be in motion). The ability to correctly detect objects using available processor or computational resources within available time limits may be required for successful operation in a particular application.

BRIEF SUMMARY

Described herein are various apparatus, methods and articles which employ neural networks in performing machine vision to parse or evaluate a three-dimensional environment, for example a three-dimensional environment in which a robot operates. Such may advantageously allow detection of objects (e.g., targets, obstacles, or even portions of the robot itself or neighboring robots) in a three-dimensional environment using limited physical computational resources, limited processing time, and/or with a high level of accuracy. Detection may include representation of a volume occupied by an object in the three-dimensional environment and/or a pose (i.e., position and orientation) of the object in the three-dimensional environment. Such may, for example, allow a robot to engage or otherwise interact with one or more target objects while avoiding obstacles in the three-dimensional environment, for instance while the robot operates autonomously and/or in real-time in the three-dimensional environment.

A method for creating a module for a robot that can extract 3D information regarding objects in a given camera view without the need for a large human-labelled training set of visual and object data. The method involves creating a first neural network that takes in the image data from one or more cameras as well as data describing visual motion (optical flow) and outputs a set of 3D depth information, such as a voxel map, a particle distribution, or polygonal information, this set of 3D depth information also includes information regarding the movement of the 3D elements in 3D spaces. The neural network is provided images and optical flow maps of a virtual generated scenes populated with a variety of objects (such as a 3D rendering of an office populated with common office items), and the resulting depth mappings and 3D data are compared to accurate depth mappings and 3D movement data generated from the corresponding virtual generated scenes to quantify the error. The first neural network is then trained through a machine learning algorithm such as neuroevolution or gradient descent using a large and varied automatically generated set of scenes and objects in those scenes until the output depth data and 3D movement data closely matches the depth of the given scene. As the rendered images provided are generated using highly realistic rendering technologies (such as raytracing), the training enables the neural network to handle real visual data as well as the virtual generated data.

Once the first neural network is satisfactorily trained the output depth information is provided to a spatial memory submodule that records and updates a persistent depth mapping and 3D movement data of the entire scene such that the spatial memory submodule integrates the information provided with information regarding the position and orientation of the camera view to create a full mapping.

A second neural network topology is then created having the output of the spatial memory submodule as an input and with an output of object boundary data. The second neural network topology is trained through a machine learning algorithm such as neuroevolution or gradient descent using a large and varied automatically generated set of scenes and objects in those scenes until the output object boundary data closely matches the object boundaries of the given scene. As the rendered images provided are generated using highly realistic rendering technologies (such as raytracing), the training enables the neural network to handle real visual data as well as the virtual generated data. The simulated 3D scenes also have virtual forces applied to the objects to cause motion, the data describing the forces applied may also be provided as input to the neural network to aid in training.

Once the object neural network is satisfactorily trained, it is deployed into a robot, where the image input data is provided by one or more cameras coupled to the robot and the output is used by other systems for localization, categorization, visualization, etc.

BRIEF DESCRIPTION OF THE DRAWINGS

In the drawings, identical reference numbers identify similar elements or acts. The sizes and relative positions of elements in the drawings are not necessarily drawn to scale.

For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, certain structures associated with processors, robots, servers, communications networks or other communications channels, and various sensors (e.g., imagers, LIDAR) or transducers have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one implementation" or "an implementation" or to "one embodiment" or "an embodiment" means that a particular feature, structure or characteristic described in connection with the embodiment is included in at least one implementation or embodiment. Thus, the appearances of the phrases "one implementation" or "an implementation" or "in one embodiment" or "in an embodiment" in various places throughout this specification are not necessarily all referring to the same implementation or embodiment. Furthermore, the particular features, structures, or characteristics may be combined in any suitable manner in one or more implementations or embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings provided herein are for convenience only and do not interpret the scope or meaning of the various implementations or embodiments.

As used in this specification and the appended claims, the term "neuroevolutionary algorithm" refers to any method, algorithm, or computer routine that updates a neural network by applying evolutionary algorithms such as, for example, a genetic algorithm on the neural networks to maximize or minimize the performance of the neural network on a criteria.

As used in this specification and the appended claims, the terms "spatial memory system" and "spatial memory sub-module" or similar refers to a system, such as a 3D physics engine, 3D particle space, or a voxel space, that is operable to take in a set or series of 3D depth mappings over time and integrate all the information from all the mappings into a singular space that includes all or most of the information that was available in the sum of the mappings.

Figure 1:
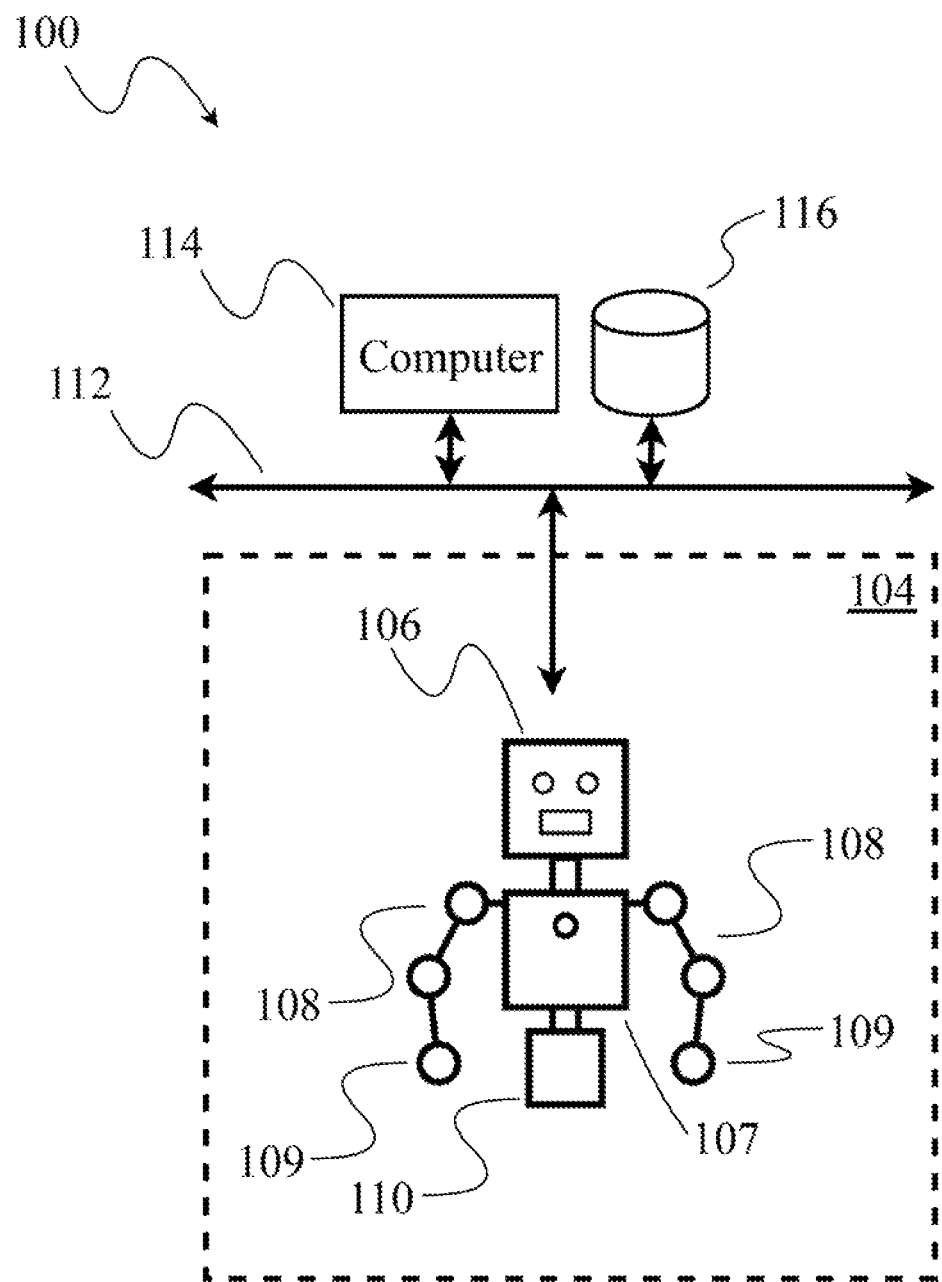
FIG. 1 is a schematic diagram of an example of a robotic system, according to at least one illustrated implementation.

FIG. 1 shows a system 100 which includes at least one robot 104 and at least one processor-based computer system 114 that can execute various methods described herein or implement modules as created by various methods described herein according to at least one illustrated implementation, and which can perform various acts described herein. As such, FIG. 1 illustrates an example of a system 100 which can execute various methods described herein or implement modules as created by various methods described herein.

The robot 104 may, for example, take the form of a humanoid robot 104.

The humanoid robot 104 can have various implementations or forms, and resembles at least a portion of a human, for example including a humanoid head 106. In some implementations, humanoid head 106 includes features that resemble a pair of eyes, features that resemble a mouth, and optionally other human-like features. Humanoid head 106 is optionally coupled to a torso 107. In some implementations, one or more robotic appendages or actuated arms (e.g., arms 108) are movably coupled to the torso 107. Each of arms 108 includes at least two links, coupled by one or more joints. The joints included in arms 108 may be actuated or passive and may couple the included links in series. Each of the arms

108 may include a respective end-effector 109, e.g., distally disposed end-effector. In the illustrated implementation, the humanoid robot 104 includes a base 110 coupled to torso 107. In other implementations, the humanoid robot 104 may include one or more leg appendages that resemble human legs (e.g., humanoid legs), wheels, treads, etc. Further details of and alternatives to humanoid robot 104 are further described with reference to FIG. 2.

One or both of the eye resembling features may take the form of an image sensor (e.g., camera) to capture images of at least a portion of an environment in which the humanoid robot 104 operates. The image sensor(s) have a respective field-of-view, and if positioned in a tandem arrangement to simulate the relative positioning of human eyes, the respective field-of-view can partially overlap, and provide for depth information via the concept underlying binocular vision. The portion of the environment encompassed by the field-of-view(s) will change as a pose (i.e., position, orientation, position and orientation) of the head, torso, or even entire humanoid robot 104 changes.

Referring to the example system 100 in FIG. 1, the humanoid robot 104 is communicatively coupled through a wired and/or wireless communications channel to a network 112. The network 112 communicatively couples humanoid robot 104 with one or more other processor-based systems, e.g., computer 114; and/or with network accessible tangible storage device 116. Network 112 may also communicatively couple the humanoid robot 104 via the Internet, or an intranet or extranet. Computer 114 may include one or more processors, for example one or more microprocessors, central processing units (CPUs), graphics processing units (GPUs), digital signal processors (DSPs), field programmable gate arrays (FPGAs), programmable logic controllers (PLCs), operable to execute instructions or logic to carry one the methods or portions thereof described herein. Computer 114 or storage device 116 may include one or more non-transitory processor-readable storage media that stores processor-executable instructions, logic and/or data, for example one or more volatile memories (e.g., random access memory (RAM), registers); nonvolatile memory (e.g., read only memory (ROM), Flash memory, electronically erasable programmable read only memory (EEPROM), solid state drive (SSD)); or spinning media storage (e.g., magnetic disk, optical disk) with associated drive (e.g., hard disk drive, optical disk drive, tape storage). Processor-executable instructions, logic and/or data may be stored as software (e.g., executable object code), firmware or other forms. Processor-executable instructions may implement methods described herein at, at least, FIG. 6. Computer 114 may include one or more buses or other communications channel communicatively coupling the processor(s) and storage media.

Figure 2:
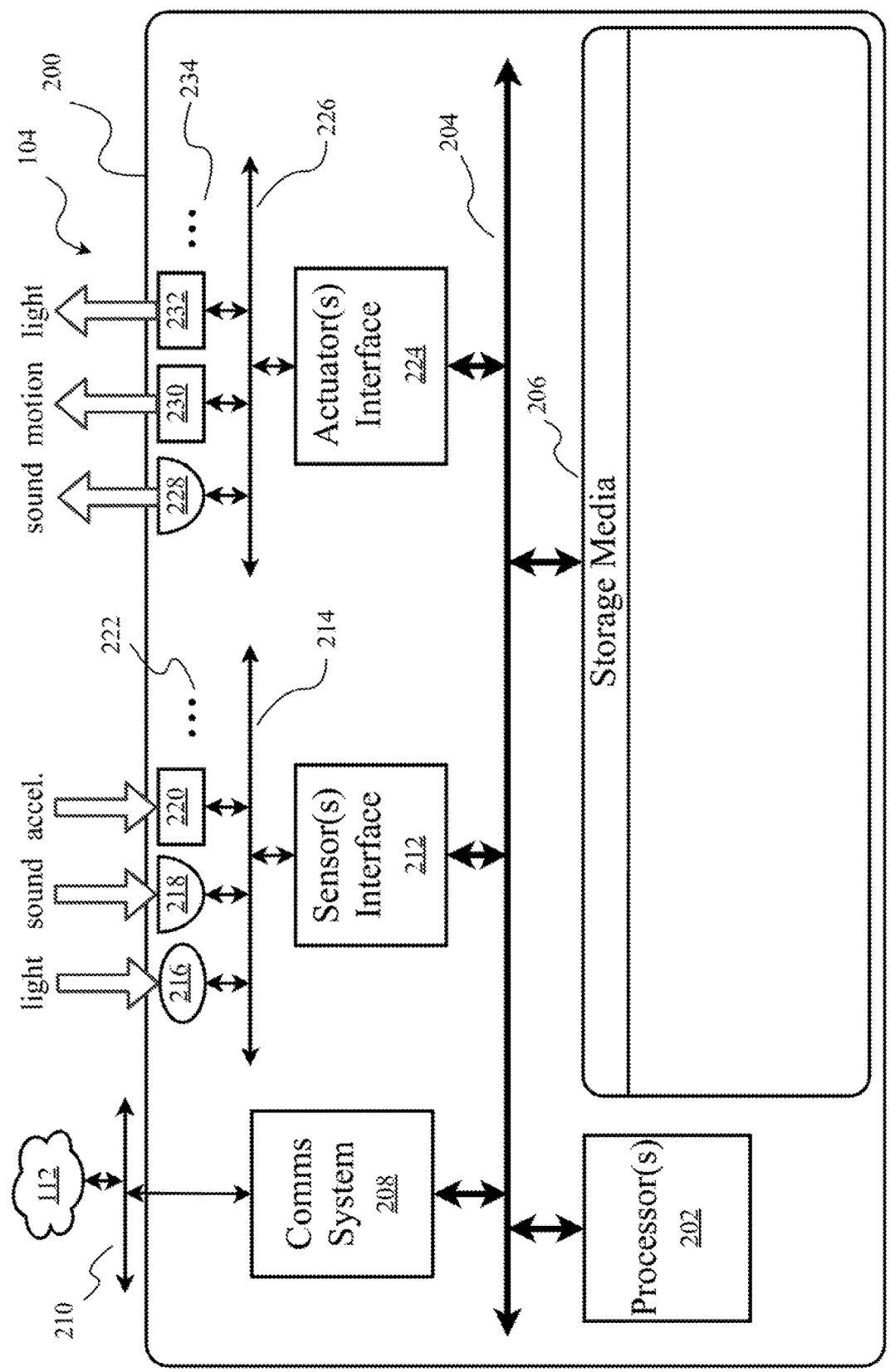
FIG. 2 is a block diagram an example robotic system, according to at least one illustrated implementation.

FIG. 2 schematically illustrates a robot 200 which may be used as humanoid robot 104 (FIG. 1). One more components in robot 200 may be included in, or comprise, humanoid robot 104, and may be used in execution of implementations of one or more methods described herein or implement modules as created by various methods described herein. Many of the components illustrated or described herein can be broken up into parts, combined into other structures, or replaced by other components.

Robot 200 includes a processing subsystem including one or more digital processors 202 and associated circuitry. Digital processors 202 include circuitry and may be any logic processing unit, such as one or more microprocessors, central processing units (CPUs), digital signal processors (DSPs), graphics processing units (GPUs), application-specific integrated circuits (ASICs), programmable gate arrays (PGAs), and programmed logic controller (PLCs).

The processor(s) 202 is(are) coupled to a data bus 204 allowing interaction between the various components of robot 200. The data bus 204 can be implemented using a variety of wired or wireless structures and associated data exchange protocols, such as USB, PCIe, SATA, NVMe, and I2C. The data bus 204 couples processor(s) 202 to a one or more non transitory digital storage devices 206 which may include a combination of hard disk drives, solid state drives, flash storage devices, tape storage, random access memory (RAM), read only memory (ROM), registers, or other digital data storage systems. The digital storage device(s) 206 stores, at least, data storage, one or more sets of processor-executable instructions that may be executed by processor(s) 202, interface drivers for the other systems. The data bus 204 is communicatively coupled to a communication system or controller 208 which allows access and control of a communication bus 210. Bus or communications port (e.g., wired port, wireless port or radio, optical fiber port) 210 communicatively couples one or more components of system 200 to a network like network 112, other wired or wireless structures, and employs interface protocols which allow system 200 to perform digital data interaction with other devices.

Sensor(s) interface 212 is communicatively coupled to data bus 204 and a sensor bus 214. One or more sensors may be coupled to sensor bus 214 such as one or more image sensors 216 (e.g., digital camera, Videocon, photodiodes, three-dimensional camera, TOF camera), one or more microphones 218, one or more acceleration sensors (single axis or multi-axis accelerometers, inertial sensors) 220, magnetic sensors, or other sensors 222. Various sensors may be located in a portion of the humanoid robot 104. For example, cameras may be positioned at or proximate the eyes, speakers positioned at or proximate the mouth, microphones positioned at or proximate the ears.

Actuator(s) interface 224 communicatively couples data bus 204 and actuator bus 226. One or more components in system 200 may interact with one or more actuators by actuator(s) interface 224. System 200 can include a variety of different types of Actuator(s) interfaces 224, for example motor controllers or microcontrollers operable to control electric motors, solenoids, electromechanical relays, valves, etc. System 200 can include a variety of different types of actuators such as one or more speakers 228, one or more force actuators 230 (e.g., electric motor, stepper motor, solenoid, pneumatic piston with piston head, piston cylinder, valves and reservoir of pressurized fluid (e.g. gas), hydraulic piston with piston head, piston cylinder, valves and reservoir of pressurized fluid (e.g. relatively incompressible liquid), magnets, haptic engines), one or more light emitting devices (such as liquid crystal display screens (LCDs), light emitting diodes (LEDs) or LED screens, etc.) 232, or other actuators 234. Various actuators may be located in a portion of the humanoid robot 104. For example, motors, solenoids or pistons can be located at or proximate joints or linkages of various appendages.

Figure 3:
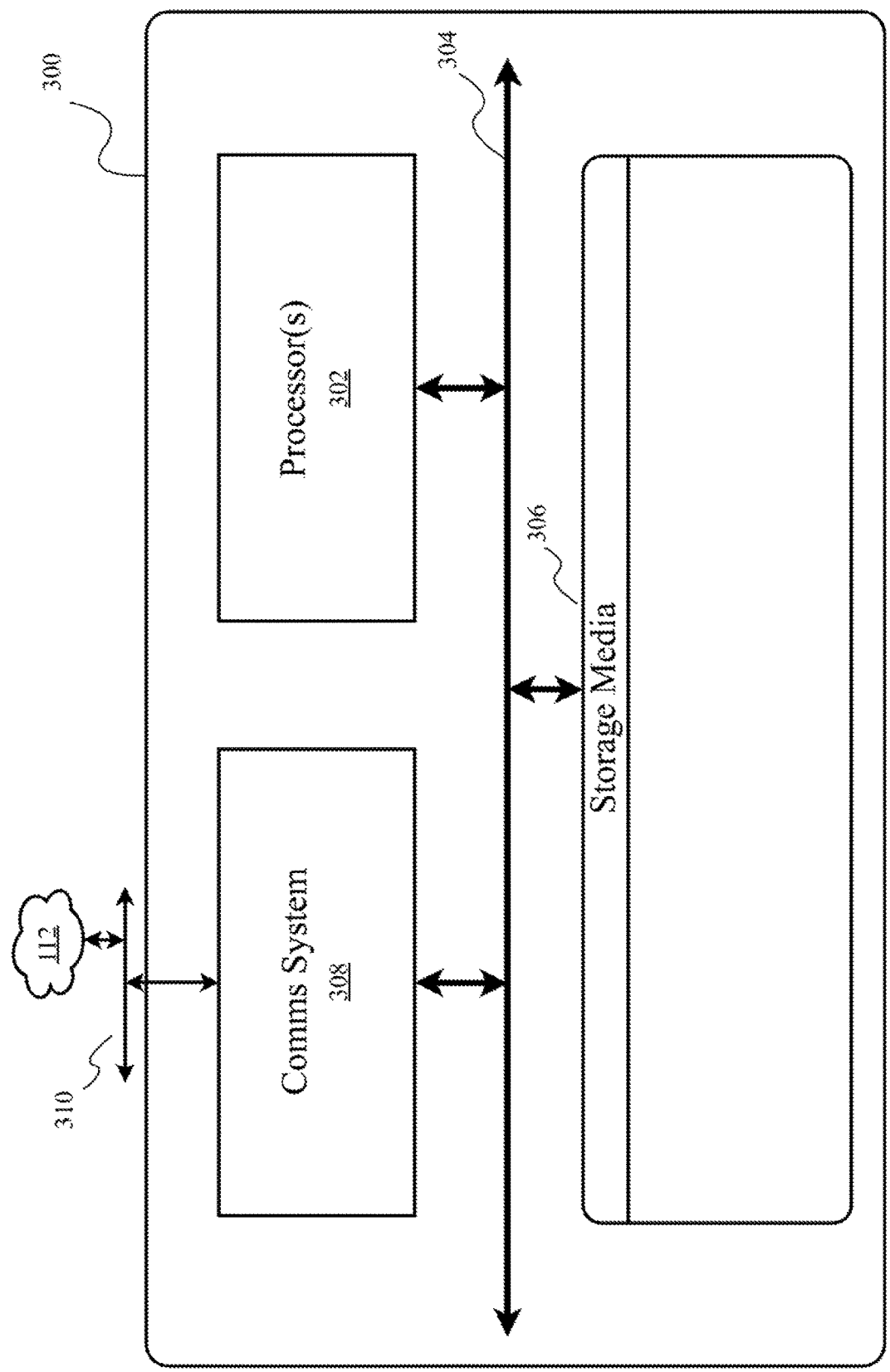
FIG. 3 is a block diagram of a computer that may be used, according to at least one illustrated implementation.

FIG. 3 schematically illustrates a computer 300 which may be used as processor based computer system 114 (FIG. 1). One more components in computer 300 may be included in, or comprise, processor based computer system 114, and may be used in execution of implementations of one or more methods described herein or implement modules as created by various methods described herein. Many of the components illustrated or described herein can be broken up into parts, combined into other structures, or replaced by other components.

Computer 300 includes a processing subsystem including one or more digital processors 302 and associated circuitry. Digital processors 302 include circuitry and may be any logic processing unit, such as one or more microprocessors, central processing units (CPUs), digital signal processors (DSPs), graphics processing units (GPUs), application-specific integrated circuits (ASICs), programmable gate arrays (PGAs), and programmed logic controller (PLCs).

The processor(s) 302 is(are) coupled to a data bus 304 allowing interaction between the various components of computer 300. The data bus 304 can be implemented using a variety of wired or wireless structures and associated data exchange protocols, such as USB, PCIe, SATA, NVMe, and I2C. The data bus 304 couples processor(s) 302 to a one or more non transitory digital storage devices 306 which may include a combination of hard disk drives, solid state drives, flash storage devices, tape storage, random access memory (RAM), read only memory (ROM), registers, or other digital data storage systems. The digital storage device(s) 306 stores, at least, data storage, one or more sets of processor-executable instructions that may be executed by processor(s) 302, interface drivers for the other systems. The data bus 304 is communicatively coupled to a communication system or controller 308 which allows access and control of a communication bus 310. Bus or communications port (e.g., wired port, wireless port or radio, optical fiber port) 310 communicatively couples one or more components of computer 300 to a network like network 112, other wired or wireless structures, and employs interface protocols which allow computer 300 to perform digital data interaction with other devices.

Figure 4:
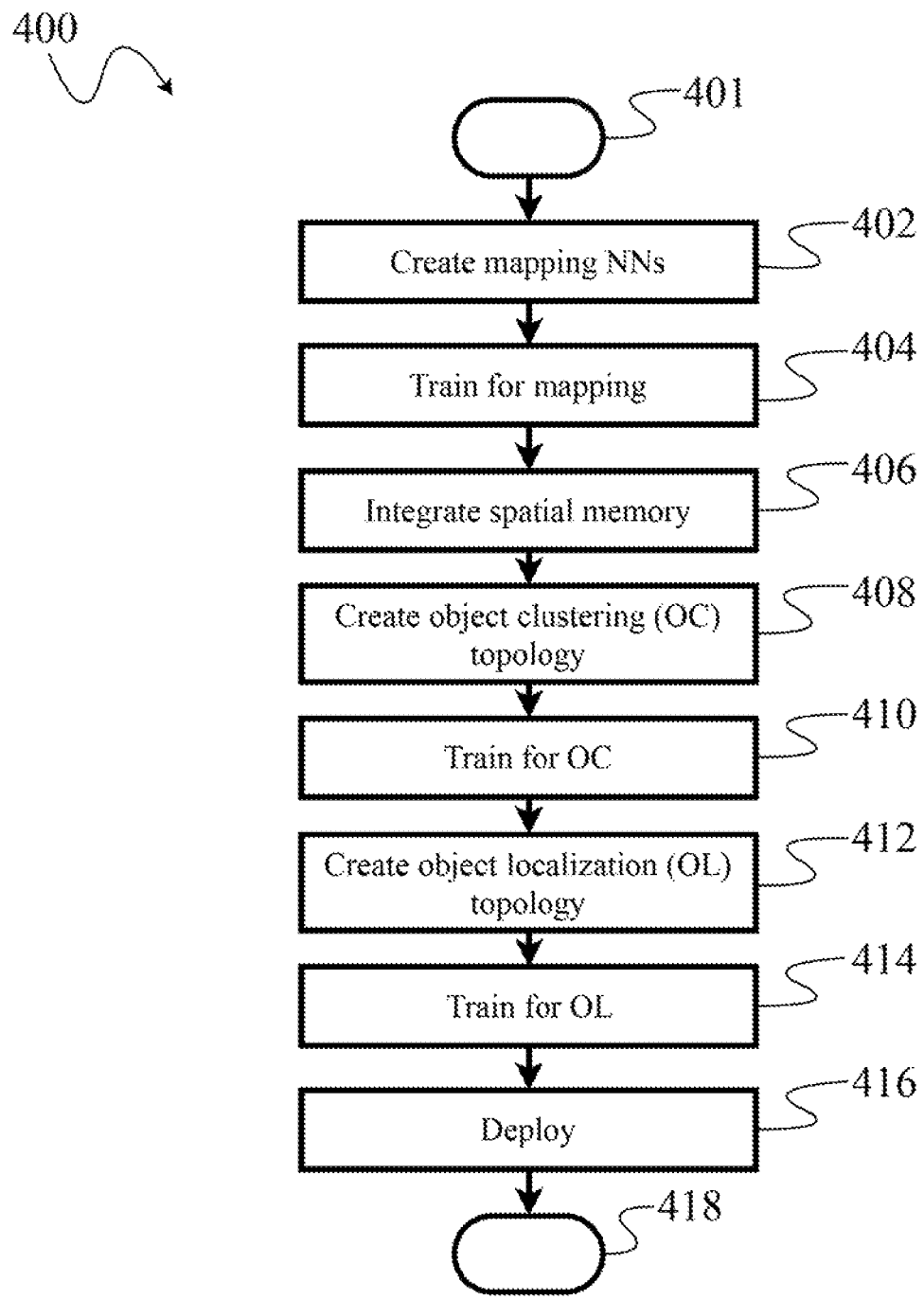
FIG. 4 is a high level flow diagram a neural network module generation method, according to at least one illustrated implementation.

FIG. 4 shows a high level neural network module generation method 400 of operation of a processor-based system to generate a neural network module that is able to process image information representing a view of a scene into three-dimensional object information that represents objects (e.g., target objects, obstacle objects) in a three-dimensional environment, for example a three-dimensional environment in which a humanoid robot 104 operates. The processor-based system may be part of the humanoid robot 104, may be co-located with the humanoid robot 104, and/or coupled to the humanoid robot 104 via a communications channel, such as a server system.

The neural network module generation method 400, and other methods described herein, may be varied to include other acts, omit acts, and/or vary acts, or perform or execute acts in a different order to accommodate alternative implementations. The neural network module generation method 400 is described as being performed by a processor-based system, for example, processor(s) in processing subsystem 202, in conjunction with other components, such as those found in system 100, robot 200, or computer 300. The processor-based system in this and other methods is referred to as singular but may be performed by multiple processor-based systems. In the neural network module generation method 400 and other methods, a processor-based system may be described as performing or executing an act and this includes performing or executing the act or causing the act to be performed or executed. The processor-based system performs the neural network module generation method 400 in response to executing processor-executable instructions or other logic.

At 401, the neural network module generation method 400 starts. For example, the method 400 may start in response to a startup of the system, a human input, or a call or invocation from a calling routine or program.

At 402, the processor-based system creates or generates a plurality of mapping neural networks (NNs). The mapping NNs created may have any of a wide array of typologies, including but not limited to convolutional NNs, recurrent NNs, modular NNs, deep NNs, dynamic NNs, encoder-decoder NNs, or some combination of types of NN topologies. The mapping NNs may each share a common typology or may have different typologies from one another. The mapping NNs each have as input at least a set of image information representing a view of a scene and as output at least a set of depth information. The mapping NNs may also take in as input view orientation data that represents an orientation of a field-of-view from which the image information was collected or captured. The mapping NNs may also take in as input optical flow data that represents a movement of pixel groups within the view of the scene.

Figure 6:
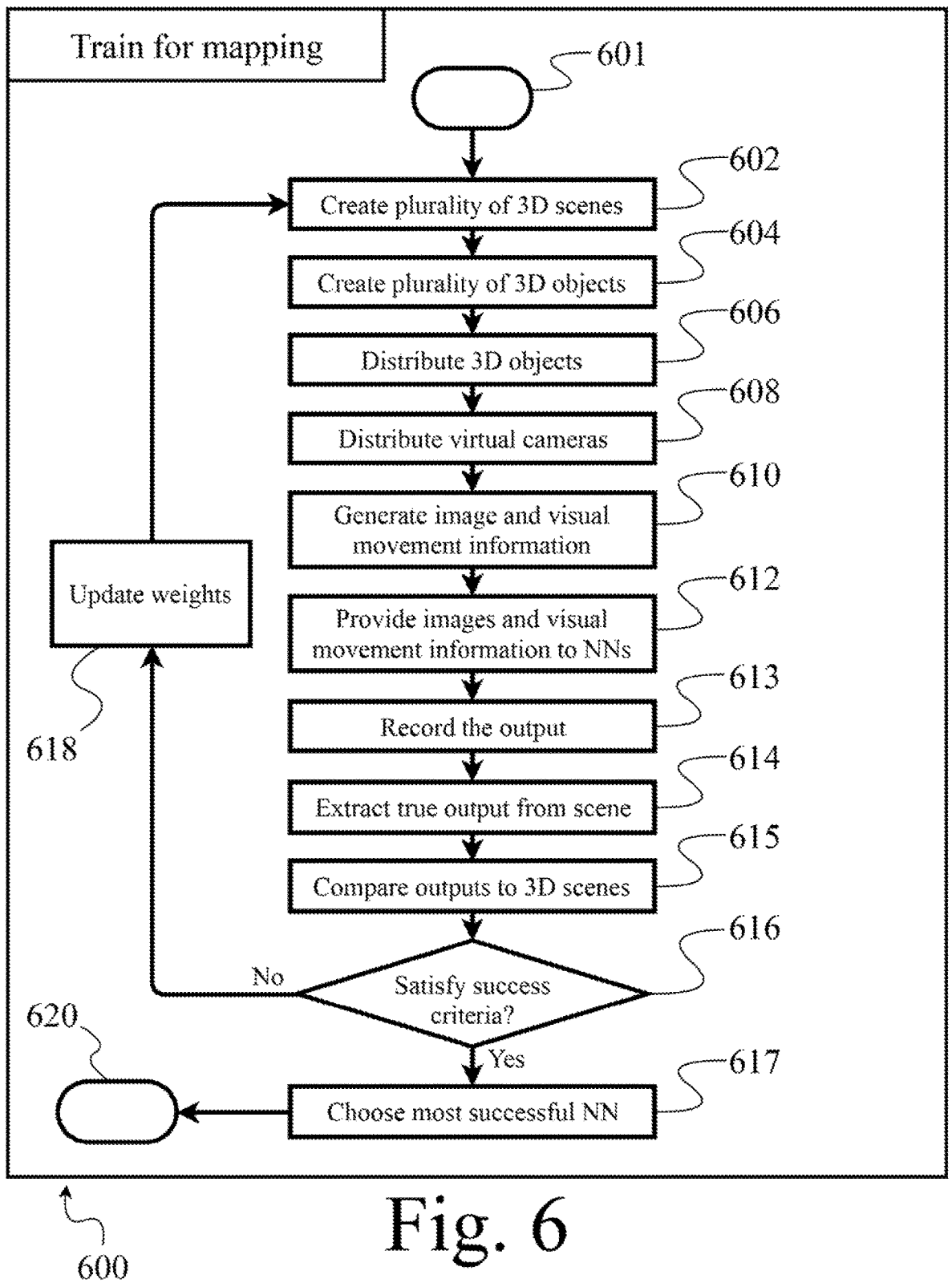
FIG. 6 is a low level flow diagram of a train for mapping method, according to at least one illustrated implementation, that may be executed as part of execution of the neural network module generation method of FIG. 4.

At 404, the processor-based system trains the mapping NNs to output depth data that at least closely approximates a true depth mapping of the scene and chooses one of the plurality of mapping NNs that best satisfies a defined criteria, for example as described in more detail herein with reference to FIG. 6.

The processor-based system couples a spatial memory system to the output of the chosen mapping NN. At 406, the spatial memory system integrates the depth data output over time into a spatial mapping using location and orientation information, as described in more detail herein with reference to FIG. 8.

At 408, the processor-based system creates an object clustering topology. For example, the processor-based system creates or generates a plurality of object clustering NNs (OCNNs) and couples the OCNNs to the output of the spatial memory system. The OCNNs created may have any of a wide array of typologies, including but not limited to convolutional NNs, recurrent NNs, modular NNs, deep NNs, dynamic NNs, encoder-decoder NNs, or some combination of types of NN topologies. The OCNNs may each share a common typology or may have different typologies from one another. The OCNNs each have as input at least a spatial mapping of a scene and as output at least a set of cluster data representing a list of likely object entities and the likelihood of each volume of the scene to be part of one or more of the likely object entities. The OCNNs may also take in kinematics data, previously derived object data, or previously derived cluster data.

Figure 10:
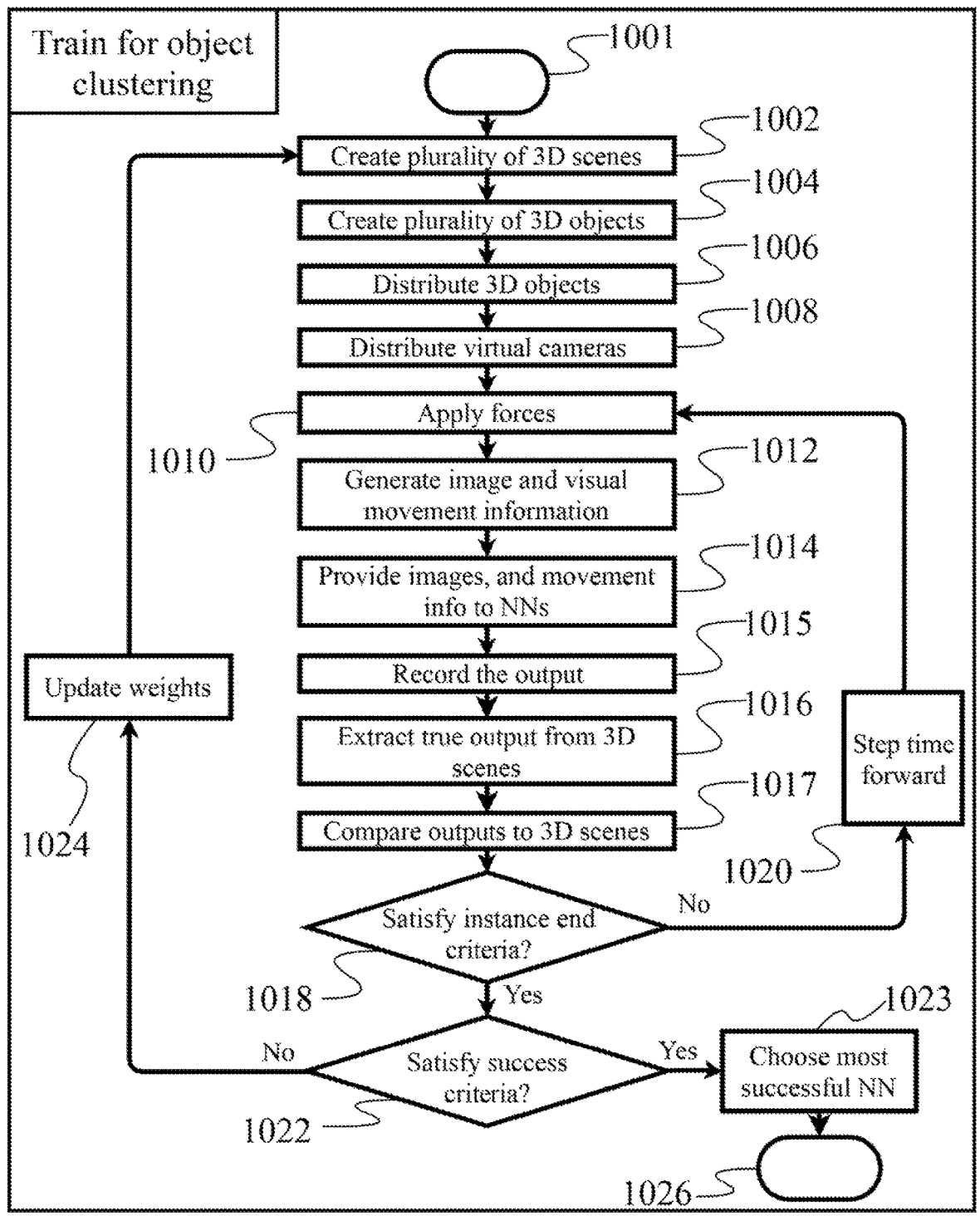
FIG. 10 is a high level flow diagram of a train for object clustering sub, according to at least one illustrated implementation.

At 410, the processor-based system trains the OCNNs to output correct cluster data and chooses one of the plurality of OCNNs that best performs at a criteria, for example as described in more detail herein with reference to FIG. 10.

At 412, the processor-based system creates an object localization (OL) topology. For example, the processor-based system creates or generates a plurality of object localization NNs (OLNNs) and couples the OLNNs to the output of the chosen OCNN. The OLNNs created may have any of a wide array of typologies, including but not limited to convolutional NNs, recurrent NNs, modular NNs, deep NNs, dynamic NNs, encoder-decoder NNs, or some combination of types of NN topologies. The OLNNs may each share a common typology or may have different typologies from one another. The OLNNs each have as input at least a set of cluster data of a scene and as output at least a set of object data representing a list of object entities and information about each object entity which may include a location, volume, mass, or shape of the corresponding object entity. The OLNNs may also take in as input kinematics data, previously derived object data, and/or previously derived cluster data.

Figure 12:
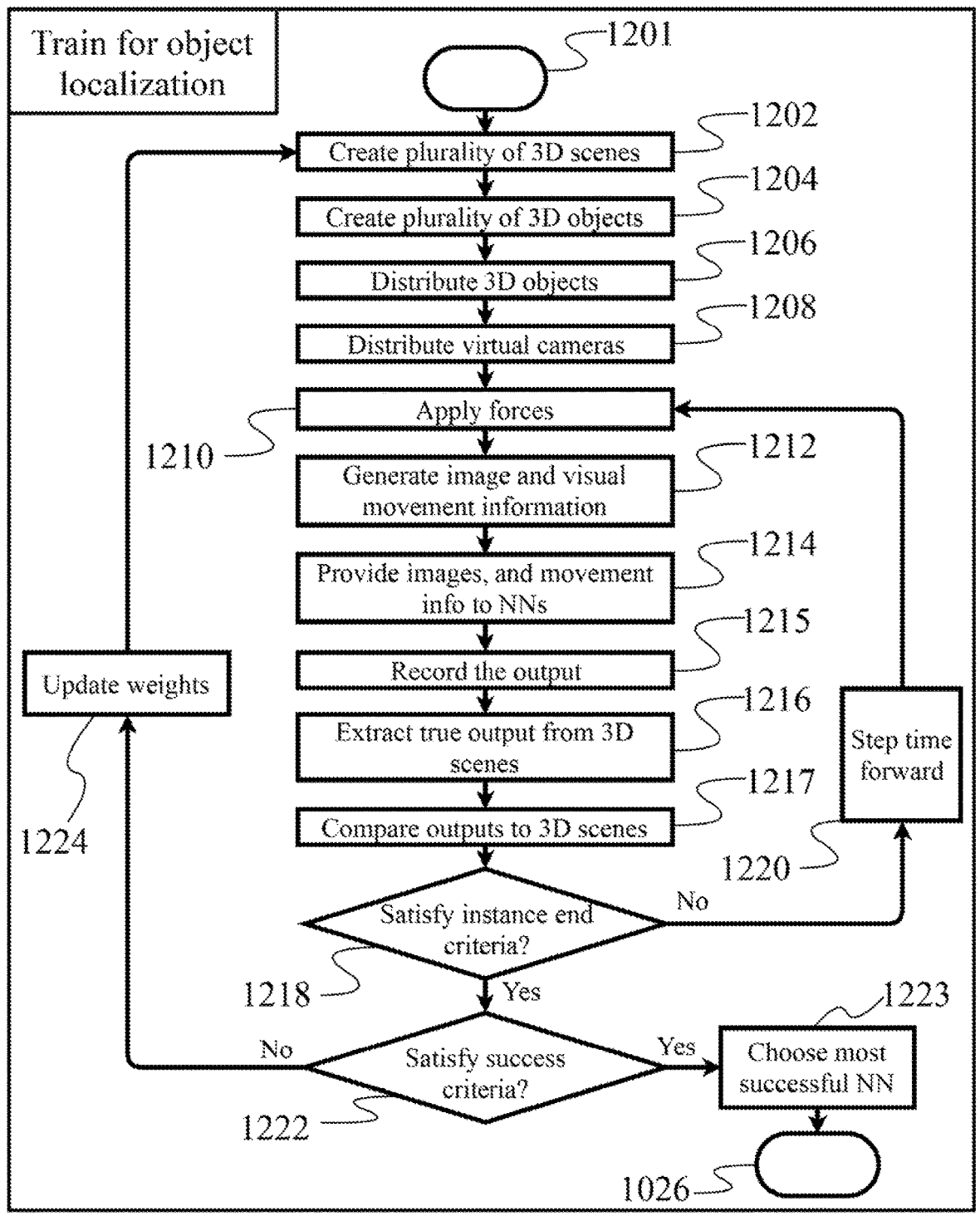
FIG. 12 is a low level flow diagram of a train for object localization method, according to at least one illustrated implementation, that may be executed as part of execution of the method of FIG. 10.

At 414, the processor-based system trains the OLNNs to output correct object data and chooses one of the plurality of OLNNs that best performs at a criteria, for example as described in more detail herein with reference to FIG. 12.

Figure 14:
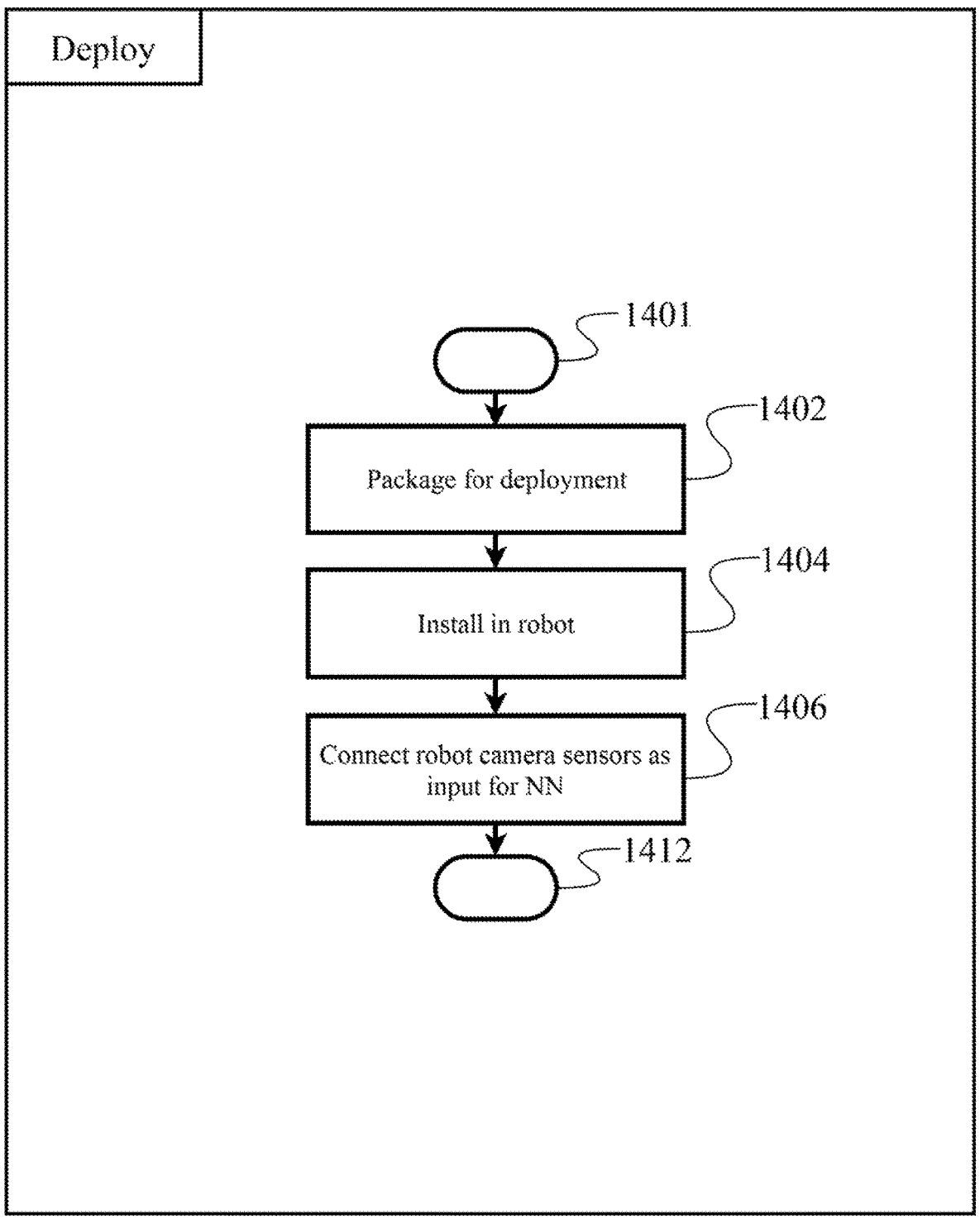
FIG. 14 is a low level flow diagram of a deploy method, according to at least one illustrated implementation, that may be executed as part of execution of the method of FIG. 10.

At 416, the processor-based system deploys the created NN structure to an electronic system and couples at least one output of at least one camera view of the electronic system to the input of the created NN structure, for example as described in more detail herein with reference to FIG. 14.

At 418, the processor-based system may terminate the neural network module generation method 400 until invoked again.

Figure 5:
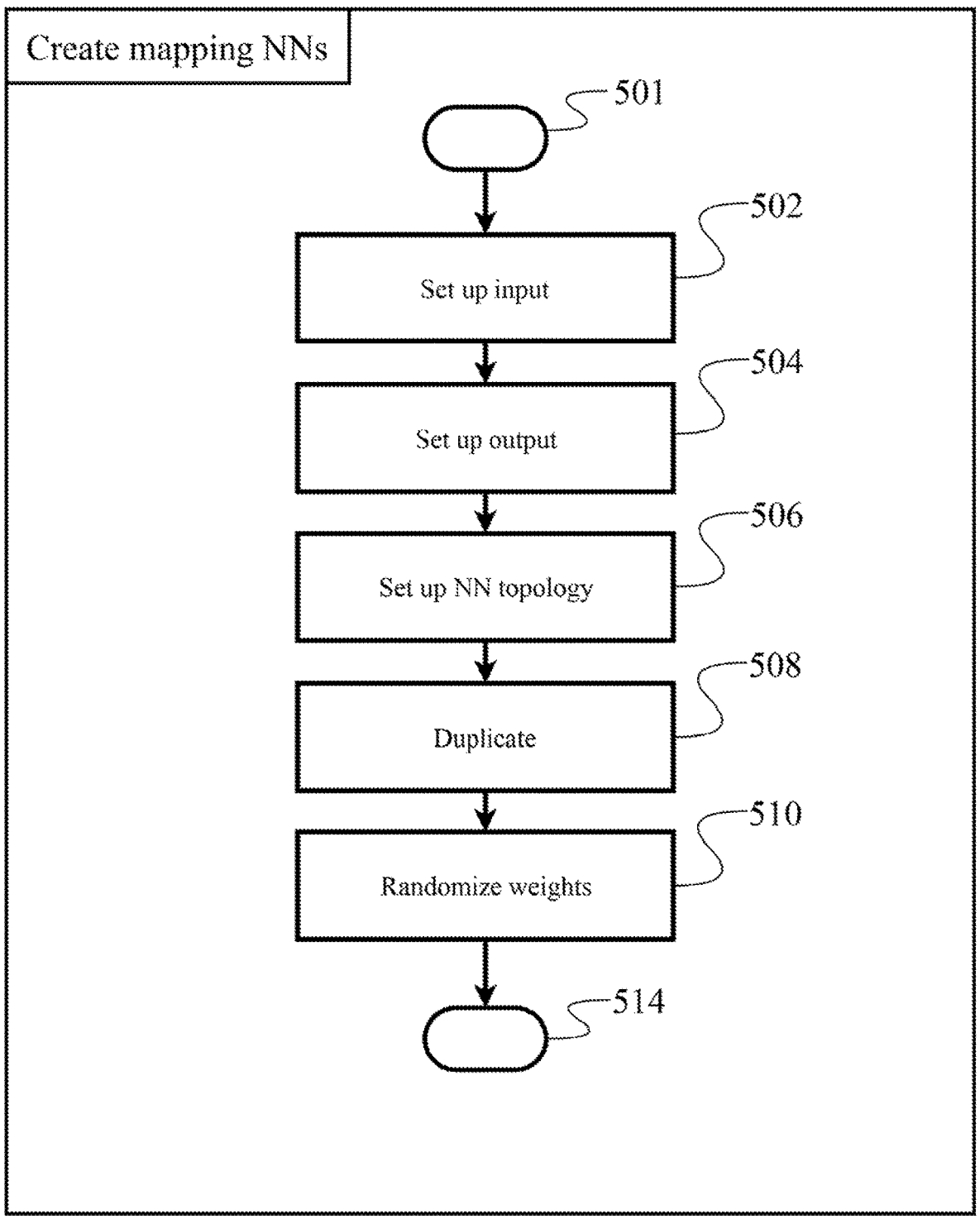
FIG. 5 is a low level flow diagram of a create mapping neural networks method, according to at least one illustrated implementation, that may be executed as part of execution of the neural network module generation method of FIG. 4.

FIG. 5 shows a method to create mapping NNs 500, according to at least one illustrated implementation. The method to create mapping NNs 500 may be performed as part of executing the neural network module generation method 400 (FIG. 4).

The method to create mapping NNs 500, in part, creates the first part of the neural network topology and creates a plurality of copies with randomized neural network weights. Method 500 may implement all or a portion of creating mapping NNs 402 of method 400 (FIG. 4). Various acts of method 500 are optional, and may be performed in a different order than presented.

The method to create mapping NNs 500 starts at 501. For example, the method to create mapping NNs 500 may start in response to a call or invocation from a calling routine or program.

At 502, the processor-based system creates or generates a set of input nodes that can be coupled to receive image information, for example from a source of image information, and coupled to receive optical flow data representing movement of pixel groups within a view of a scene. In some implementations, the processor-based system may also create or generate a set of input nodes that can be coupled to receive to take in as input view orientation data in addition to or instead of the optical flow data. The optical flow data is supplied by an external routine that derives the optical flow data from series of image data.

At 504, the processor-based system creates or generates a set of output nodes that can be coupled to provide depth data. The depth data in this implementation may, for example, be composed of a point cloud containing a set of points each having a three-dimensional location, a color, and a three-dimensional movement or motion vector. Other implementations may use polygonal three-dimensional information or other three-dimensional information.

At 506, the processor-based system creates or generates a set of neural layers between the input nodes and output nodes, connecting subsequent layers in a deep convolutional neural network topology. Other implementations may use a variety of other topologies, in addition to or in lieu of a deep convolutional neural network topology, for example convolutional NNs, recurrent NNs, modular NNs, deep NNs, dynamic NNs, encoder-decoder NNs, or some combination of types of NN topologies.

At 508, the processor-based system duplicates the topology created in 502, 504, and 506 a plurality of times in preparation for training the network.

At 510, the processor-based system randomizes the neural weights of each of the plurality of duplicate topologies such that each topology has a unique set of neural weights that spans a large range of weights. Other implementations may use non-random methods of creating the neural weights or using another method for creating a set of neural networks ready for training.

The method to create mapping NNs 500 may terminate at 514, until invoke again.

FIG. 6 shows a method to train for mapping 600, according to at least one illustrated implementation. The method to train for mapping 600 may be performed as part of executing the neural network module generation method 400 (FIG. 4).

The method to train for mapping 600, in part, trains the mapping NNs created or generated in method 402 such that the mapping NNs provide an accurate depth mapping of the view provided. Method 600 may implement all or a portion of training for mapping 404 of method 400 (FIG. 4). Various acts of method 600 are optional, and may be performed in a different order than presented.

The method to train for mapping 600 starts at 601. For example, the method to train for mapping 600 may start in response to a call or invocation from a calling routine or program.

At 602, the processor-based system creates or generates a plurality of virtual three-dimensional scenes each having a randomly generated layout.

At 604, the processor-based system creates or generates a plurality of virtual three-dimensional objects using randomizable templates of common objects, such as electronic devices, mugs and cups, and tables and chairs. In other implementations, the processor-based system may retrieve the plurality of virtual three-dimensional objects from a previously defined or generated set stored by a non-transitory processor-readable storage medium.

At 606, the processor-based system distributes the virtual three-dimensional objects around the plurality of virtual three-dimensional scenes such that the virtual three-dimensional objects are in random positions and orientations, but are at reasonable locations, such as chairs being on floors and mugs being on tables. Each of the virtual three-dimensional objects may have a randomized velocity vector.

At 608, the processor-based system distributes, locates or positions one or more virtual cameras throughout or with respect to the virtual three-dimensional scenes such that the virtual cameras are in random poses (i.e., positions and orientations), but are at reasonable locations, such as being between eye level and knee level, having a horizontal axis of the camera be parallel to a plane of a floor, and having a direction or field-of-view of the camera be within reasonable bounds from a human viewpoint. The virtual cameras may also come in pairs placed to mimic the relative locations and orientations of two human eyes.

At 610, the processor-based system renders the virtual three-dimensional scenes from a respective viewpoint of each of the virtual cameras using a rendering engine creating as realistic an image as possible. The rendering engine may, for example, use tools such as simulated depth of field, motion blur, and lighting and reflection raytracing, other implementations may use other rendering tools. A different subroutine may also be initiated here that provides corresponding optical flow data. The subroutine may be a proprietary system or an open source system.

At 612, the processor-based system provides the created images and visual movement information to each of the plurality of mapping NNs created or generated at 402 and at 613 records the output depth mapping of each of the mapping NNs in response to each of the images from each virtual camera.

At 614, the processor-based system extracts the real depth mappings from each of the three-dimensional scenes from the point of view of each of the virtual cameras and at 615 compares the outputs of each of the plurality of mapping NNs to the real depth mappings from each of the three-dimensional scenes to create an error score for each of the mapping NNs that quantifies the error of the mapping accuracy of that mapping NN.

At 616, the processor-based system determines whether a set of defined criteria has been met that indicates training conclusion. For example, the processor-based system may determine whether any of the mapping NNs have an error score that is lower than a threshold target error rating. If the defined criteria is satisfied, the processor-based system chooses or selects the most successful mapping NN at 617 and proceeds to 620. If the defined criteria is not satisfied, the processor based system proceeds to 618.

At 618, the processor-based system updates weights through a neuroevolutionary algorithm. Other implementations may use a variety of other methods and algorithms for updating the weights such as gradient descent, genetic evolution, or genetic programming. The method then proceeds to 602.

The method to train for mapping 600 may terminate at 620, until invoke again.

The primary loop created in method 600 through 602, 604, 606, 608, 610, 612, 614, 616, 618, and then back to 602 is only an example of a primary loop. In other implementations the primary loop may loop back to 604, 606, 608, 610, or 612 instead of 602.

Figure 7:
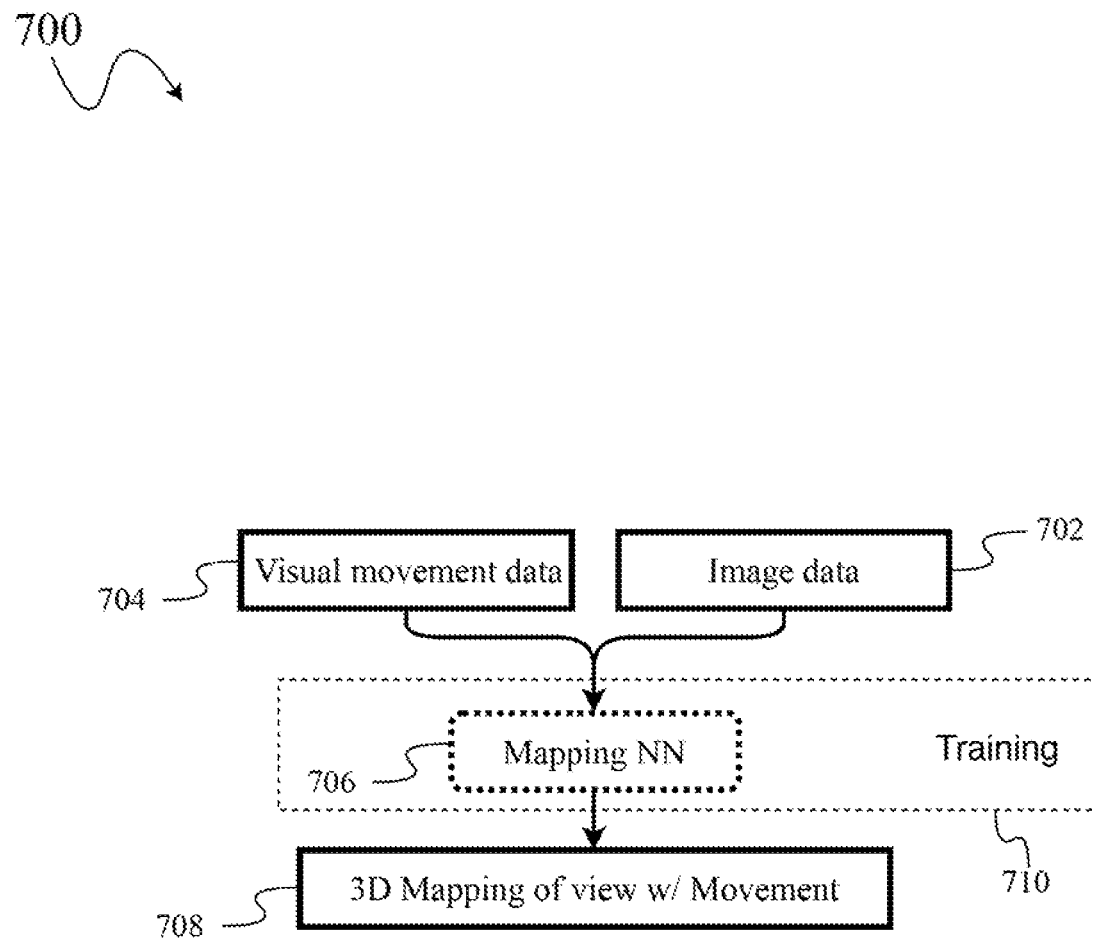
FIG. 7 is a data flow diagram of a neural network system during execution of the train for mapping method, according to at least one illustrated implementation.

FIG. 7 shows a simplified example of operation of an overall neural network system 700 during execution of method 600 in FIG. 6.

A set of image data 702 that represents a view of a scene and a set of associated visual movement data 704 is provided to an input layer of a mapping NN topology 706 which is undergoing training process 710. The output of the mapping NN topology 706 is a set of point cloud mappings of the provided views 708 having associated movement information.

Figure 8:
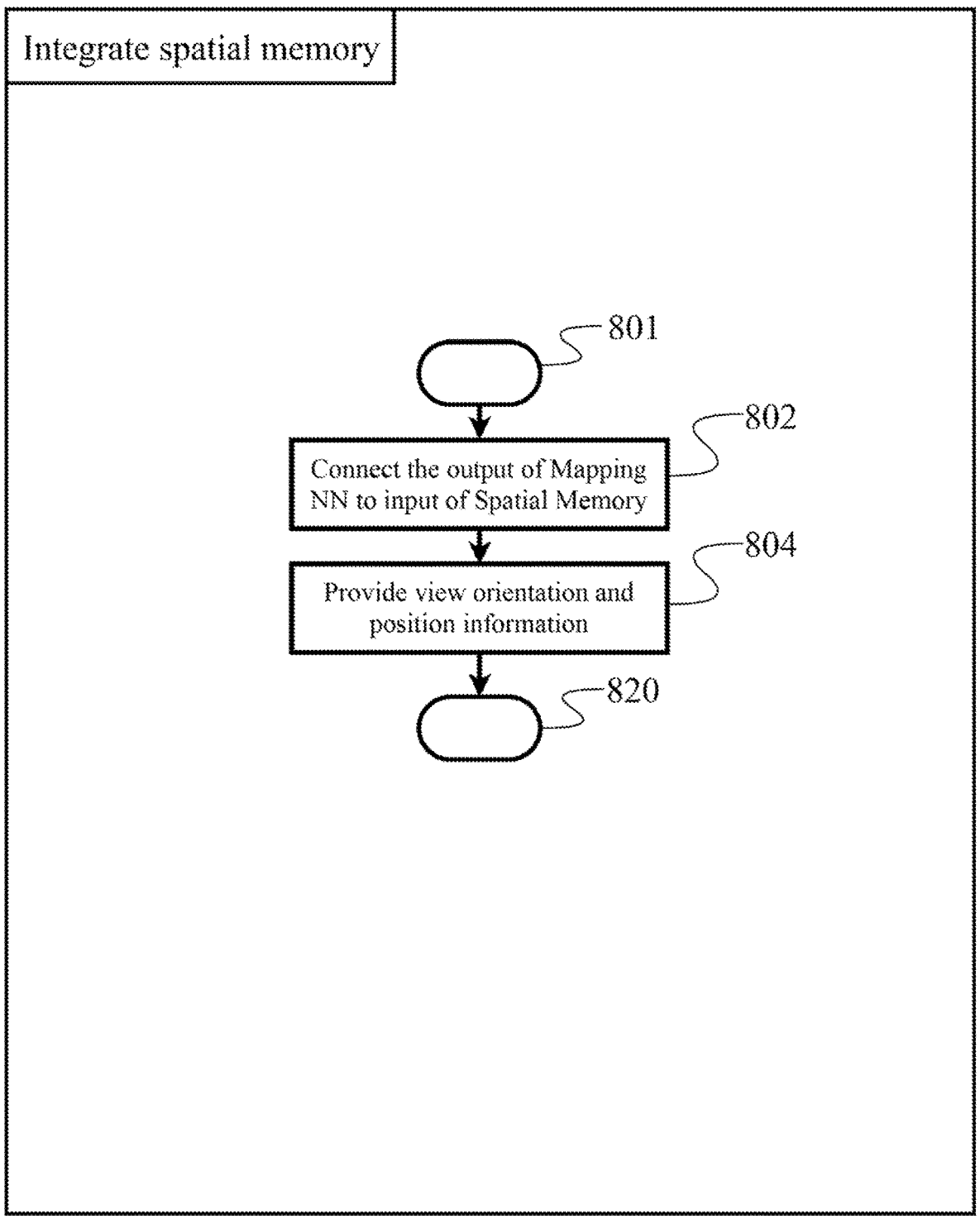
FIG. 8 is a low level flow diagram of an integrate spatial memory method, according to at least one illustrated implementation, that may be executed as part of execution of the neural network module generation method of FIG. 4.

FIG. 8 shows an integration method 800 to integrate spatial memory system, according to at least one illustrated implementation. The integration method 800 to integrate spatial memory system may be performed as part of executing the neural network module generation method 400 (FIG. 4).

The integration method 800 to integrate spatial memory system, in part, couples a chosen best mapping NN to a spatial memory system. The integration method 800 may implement all or a portion of integrating spatial memory 406 of method 400 (FIG. 4). Various acts of integration method 800 are optional, and may be performed in a different order than presented.

The integration method 800 to integrate spatial memory system starts at 801. For example, the integration method 800 may start in response to a call or invocation from a calling routine or program.

At 802, the processor-based system couples the output of the chosen mapping NN to the input of a spatial memory system that can integrate the mapping over time, creating a larger mapping when the view moves, rotates, or moves and rotates.

At 804, the processor-based system couples the position and orientation of the view to the spatial memory system.

The method 800 to integrate spatial memory system may terminate at 820, until invoke again.

Figure 9:
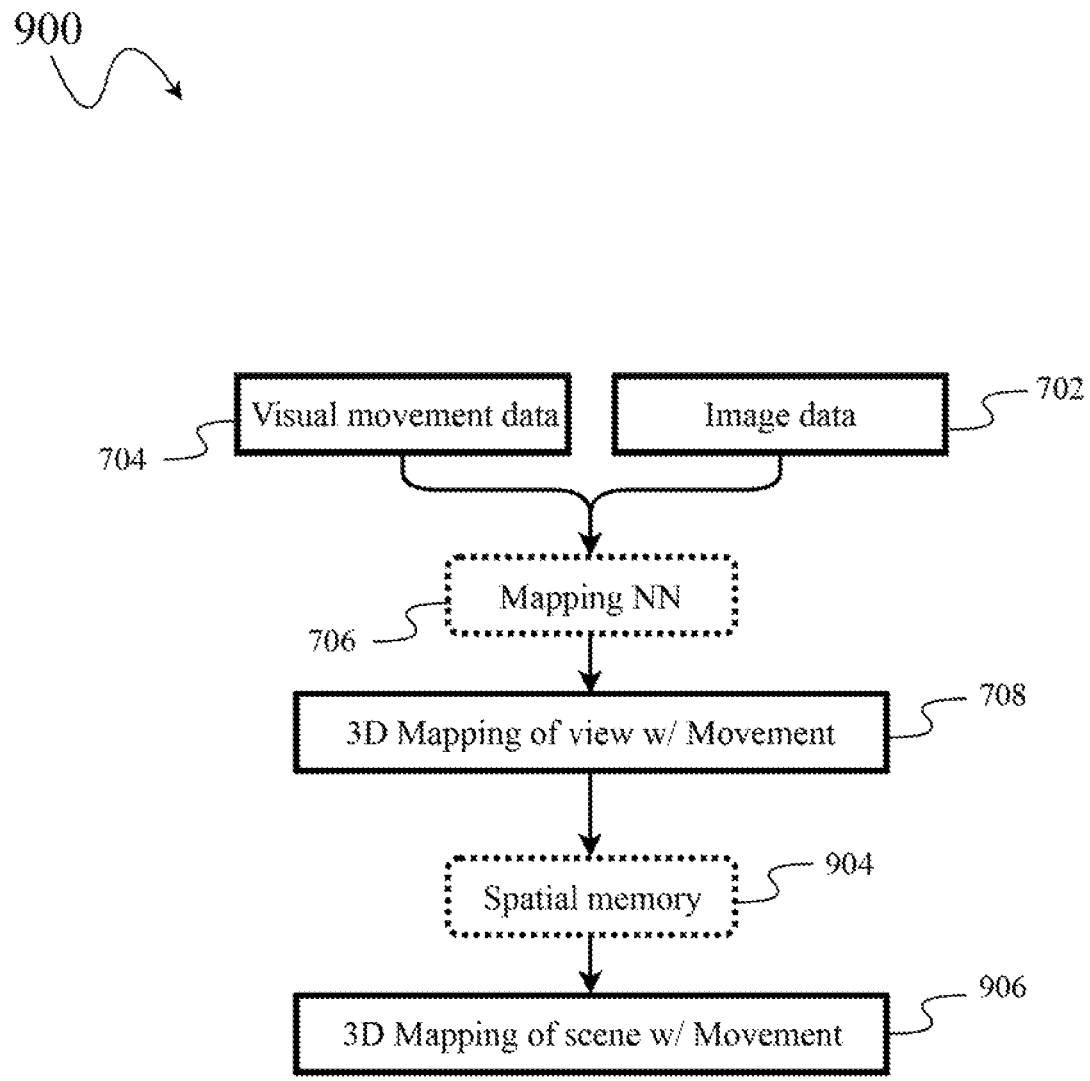
FIG. 9 is a data flow diagram of a neural network system after execution of the integrate spatial memory method, according to at least one illustrated implementation.

FIG. 9 shows a simplified example of operation of an overall neural network system 900 during execution of method 800 in FIG. 8.

A set of image data 702 of a view of a scene and a set of associated visual movement data 704 is provided as input to an input layer of a mapping NN topology 706. The output of the mapping NN topology 706 is a set of point cloud mappings of the provided views 708 having movement information.

The set of point cloud mappings of the provided views 708 is coupled to the spatial memory system 904. The output of the spatial memory system is a set of point cloud mappings of the scene 906 having associated movement information.

FIG. 10 shows an object clustering training method 1000 to train for object clustering, according to at least one illustrated implementation. The object clustering training method 1000 may be performed as part of executing the neural network module generation method 400 (FIG. 4).

The object clustering training method t, in part, trains the OCNNs created or generated at 408 of method 400 such that the OCNNs provide an accurate object clustering of the scene. The object clustering training method 1000 may implement all or a portion of training for object clustering 410 of method 400 (FIG. 4). Various acts of object clustering training method 1000 are optional, and may be performed in a different order than presented.

The object clustering training method 1000 starts at 1001. For example, the object clustering training method 1000 may start in response to a call or invocation from a calling routine or program.

At 1002, the processor-based system creates or generates a plurality of virtual three-dimensional scenes, each virtual three-dimensional scene having a respective randomly generated layout.

At 1004, the processor-based system creates a plurality of virtual three-dimensional objects using randomizable templates of common objects, such as electronic devices, mugs and cups, and tables and chairs. In other implementations, the processor-based system may retrieve the plurality of virtual three-dimensional objects from a set of previously defined or generated virtual three-dimensional objects stored by a non-transitory processor-readable storage media.

At 1006, the processor-based system distributes the virtual three-dimensional objects around the plurality of virtual three-dimensional scenes such that the virtual three-dimensional objects are in random positions and orientations, but are at reasonable locations, such as chairs being on floors and mugs being on tables. Each of one or more of the virtual three-dimensional objects may have a randomized velocity vector where the virtual three-dimensional object is a dynamic object that moves over a relevant period of time.

At 1008, the processor-based system distributes, locates or positions virtual cameras throughout or with respect to the three-dimensional scenes such that the virtual cameras are in random positions and orientations, but are at reasonable locations, such as being between eye level and knee level, for example having a horizontal axis of the virtual camera parallel to a plane of a floor or ground, and/or having a direction of a field-of-view of a virtual camera within reasonable bounds for a human viewpoint. The virtual cameras may also come in pairs placed to mimic the relative locations and orientations of two human eyes.

At 1010, the processor-based system pseudo-randomly applies virtual simulated forces on the virtual three-dimensional objects in order to cause one or more of the virtual three-dimensional objects to move within the virtual three-dimensional scene.

At 1012, the processor-based system generates or creates, for example by rendering the virtual three-dimensional scenes from each of the virtual cameras using a rendering engine, creating or generating as realistic an image as possible. For example, in some implementations the rendering engine uses tools such as simulated depth of field, motion blur, and lighting and reflection raytracing. Other implementations may use other rendering tools. A subroutine may also be initiated or invoked here that provides optical flow data. The subroutine may be part of a proprietary system or an open source system.

At 1014, the processor-based system provides views and visual movement information as input to an input layer of the mapping NN, which in turn provides a depth mapping to each of the plurality of OCNNs created in 408 and records the output object cluster data of each of the OCNNs in response to each of the images from each virtual camera at 1015.

The processor-based system extracts the real object cluster data from each of the three-dimensional scenes from the point of view of each of the virtual cameras at 1016. At 1017, the processor-based system compares the outputs of each of the plurality of OCNNs to the real object cluster data from each of the three-dimensional scenes to create or generate an error score for each of the OCNNs, the error score quantifying an error of the object clustering accuracy of the corresponding OCNN.

At 1018, the processor-based system determines whether a set of defined criteria has been met that indicates the processing of a current instance of a scene or segment or episode is ready to be concluded. For example, the processor-based system may determine whether a defined time limit has been met or exceeded. If the defined criteria is satisfied proceeds to 1022. If the defined criteria is not satisfied, the processor based system proceeds to 1020.

At 1020, the processor-based system increments a simulated time forward by a small time frame or period. This may include moving and/or rotating one or more of the virtual cameras slightly and/or moving and rotating one or more virtual objects as determined by the forces acting on those virtual objects and/or the respective velocities of those virtual objects. The processor based system then proceeds to 1010.

At 1022, the processor-based system determines whether a set of defined criteria has been met that indicates the training is ready to be concluded. For example, the processor-based system may determine whether any of the OCNNs have an error score that is lower than a threshold target error rating. If the defined criteria is satisfied, the processor-based system chooses or selects the most successful OCNN at 1023 and proceeds to 1026. If the defined criteria is not satisfied, the processor based system proceeds to 1024.

At 1024, the processor-based system updates the neural weights of the OCNNs, for example via a neuroevolutionary algorithm. Other implementations may use a variety of other methods and algorithms for updating the weights such as gradient descent, genetic evolution, or genetic programming. The method then proceeds to 1002.

The object clustering training method 1000 may terminate at 1020, until invoke again.

The primary loop created in the object clustering training method 1000 through 1002, 1004, 1006, 1008, 1010, 1012, 1014, 1016, 1018, and then back to 1002 is only an example of what a primary loop may look like. In other implementations the primary loop may loop back to 1004, 1006, 1008, 1010, or 1012 instead of 1002.

The secondary loop created in the object clustering training method 1000 through 1010, 1012, 1014, 1016, 1018, 1020, and then back to 1010 is only an example of a primary loop. In other implementations the primary loop may loop back to 1008, 1010, or 1012 instead of 1002.

Figure 11:
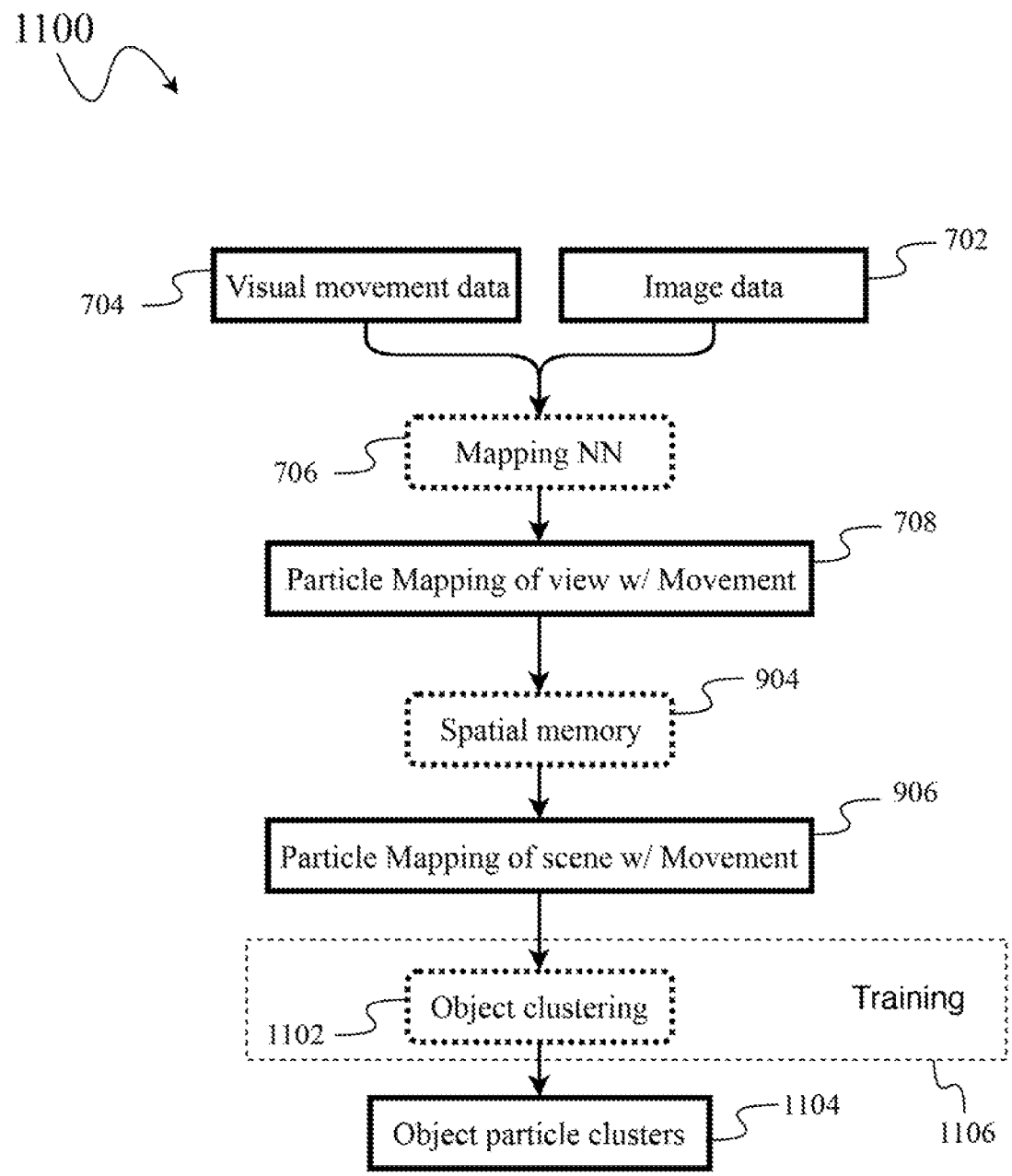
FIG. 11 is a data flow diagram of a neural network system during execution of the train for object clustering method, according to at least one illustrated implementation.

FIG. 11 shows an overview of a simplified example of operation of an overall neural network system 1100 during execution of the object clustering training method 1000 in FIG. 10.

A set of image data 702 of a view of a scene and a set of associated visual movement data 704 is coupled into a mapping NN topology 706. The output of the mapping NN topology 706 is a set of point cloud mappings of the provided views 708 along with associated movement information.

The set of point cloud mappings of the provided views 708 is coupled to the spatial memory system 904. The output of the spatial memory system is a set of point cloud mappings of the scene 906 having movement information.

The set of point cloud mappings of the scene 906 are coupled to as input to an input layer of an object clustering NN topology 1102, which returns a set of output object particle clusters 1104 via an output layer thereof. The object clustering NN topology 1102 is in the process of undergoing a neural network training procedure 1106.

FIG. 12 shows an object localization training method 1200 to train for object localization 1200, according to at least one illustrated implementation. The object localization training method 1200 may be performed as part of executing the neural network module generation method 400 (FIG. 4).

The object localization training method 1200, in part, trains the OLNNs created or generated in executing the method 408 such that the OLNNs provide an accurate object localization of the scene. The object localization training method 1200 may implement all or a portion of training for object localization 414 of method 400 (FIG. 4). Various acts of the object localization training method 1200 are optional, and may be performed in a different order than presented.

The object localization training method 1200 starts at 1201. For example, the object localization training method 1200 may start in response to a call or invocation from a calling routine or program.

At 1202, the processor-based system creates or generates a plurality of virtual three-dimensional scenes each having a randomly generated layout.

At 1204, the processor-based system creates or generates plurality of virtual three-dimensional objects using randomizable templates of common objects, such as electronic devices, mugs and cups, and tables and chairs. In other implementations, the processor-based system may retrieve the plurality of virtual three-dimensional objects from a set of previously defined or generated virtual three-dimensional objects and stored in non-transitory processor-readable storage media.

At 1206, the processor-based system distributes the virtual three-dimensional objects around the plurality of virtual three-dimensional scenes such that the virtual objects are in random positions and orientations, but are at reasonable locations, such as chairs being on floors and mugs being on tables. Each of the virtual objects may have a randomized velocity vector associated therewith, indicating a direction and speed of the virtual object.

At 1208, the processor-based system distributes, positions or locates virtual cameras throughout or with respect to the three-dimensional scenes such that the virtual cameras are in random positions and orientations, but are at reasonable locations, such as being between eye level and knee level, having the horizontal axis of the virtual camera parallel to a plane of a floor or ground, and/or having the direction of a field-of-view of a virtual camera within reasonable bounds for a human viewpoint. The virtual cameras may also come in pairs placed to mimic the relative locations and orientations of two human eyes.

At 1210, the processor-based system pseudo-randomly applies virtual simulated forces on the virtual three-dimensional objects in order to cause the virtual three-dimensional objects to move.

At 1212, the processor-based system generates or creates, for example by rendering the virtual three-dimensional scenes from each of the virtual cameras using a rendering engine, creating or generating as realistic an image as possible. For example, in some implementations the rendering engine uses tools such as simulated depth of field, motion blur, and lighting and reflection raytracing. Other implementations may use other rendering tools. A subroutine is also initiated here that provides the optical flow data. The subroutine may be part of a proprietary system or an open source system.

At 1214, the processor-based system provides views and visual movement information as input to an input layer of the mapping NN, which in turn provides a depth mapping to the chosen OCNN, which provides object clustering information to the plurality of OLNNs, and records the output object data of each of the OLNNs in response to each of the images from each virtual camera at 1215.

The processor-based system extracts the real object data from each of the three-dimensional scenes from the point of view of each of the virtual cameras at 1216. At 1217, the processor-based system compares the outputs of each of the plurality of OLNNs to the real object data from each of the three-dimensional scenes to create or generate an error score for each of the OLNNs, the error score quantifying an error of the object localization accuracy of the corresponding OLNN.

At 1218, the processor-based system determines whether a set of defined criteria has been met that indicates a current instance of a scene, segment or episode is ready to be concluded. For example, the processor-based system may determine whether a defined time limit has been met or exceeded. If the defined criteria is satisfied proceeds to 1222. If the defined criteria is not satisfied, the processor based system proceeds to 1220.

At 1220, the processor-based system increments a simulated time forward by a small time frame or period. This may include moving and/or rotating one or more of the virtual cameras slightly and/or moving and/or rotating one or more of the virtual objects as determined by the forces acting on the virtual objects and/or based on the respective velocities associated with the virtual objects. The processor based system then proceeds to 1210.

At 1222, the processor-based system determines whether a set of defined criteria has been met that indicates training is ready to be concluded. For example, the processor-based system may determine whether any of the OLNNs have an error score that is lower than a threshold target error rating. If the defined criteria is satisfied, the processor-based system chooses or selects the most successful OLNN at 1223 and proceeds to 1226. If the defined criteria is not satisfied, the processor based system proceeds to 1224.

At 1224, the processor-based system updates the neural weights of the OLNNs for example via a neuroevolutionary algorithm. Other implementations may use a variety of other methods and algorithms for updating the weights such as gradient descent, genetic evolution, or genetic programming. The method then proceeds to 1202.

The object localization training method 1200 may terminate at 1220, until invoke again.

The primary loop created in the object localization training method 1200 through 1202, 1204, 1206, 1208, 1210, 1212, 1214, 1216, 1218, and then back to 1202 is only an example of a primary loop. In other implementations the primary loop may loop back to 1204, 1206, 1208, 1210, or 1212 instead of 1202.

The secondary loop created in the object localization training method 1200 through 1210, 1212, 1214, 1216, 1218, 1220, and then back to 1210 is only an example of a primary loop. In other implementations the primary loop may loop back to 1208, 1210, or 1212 instead of 1202.

Figure 13:
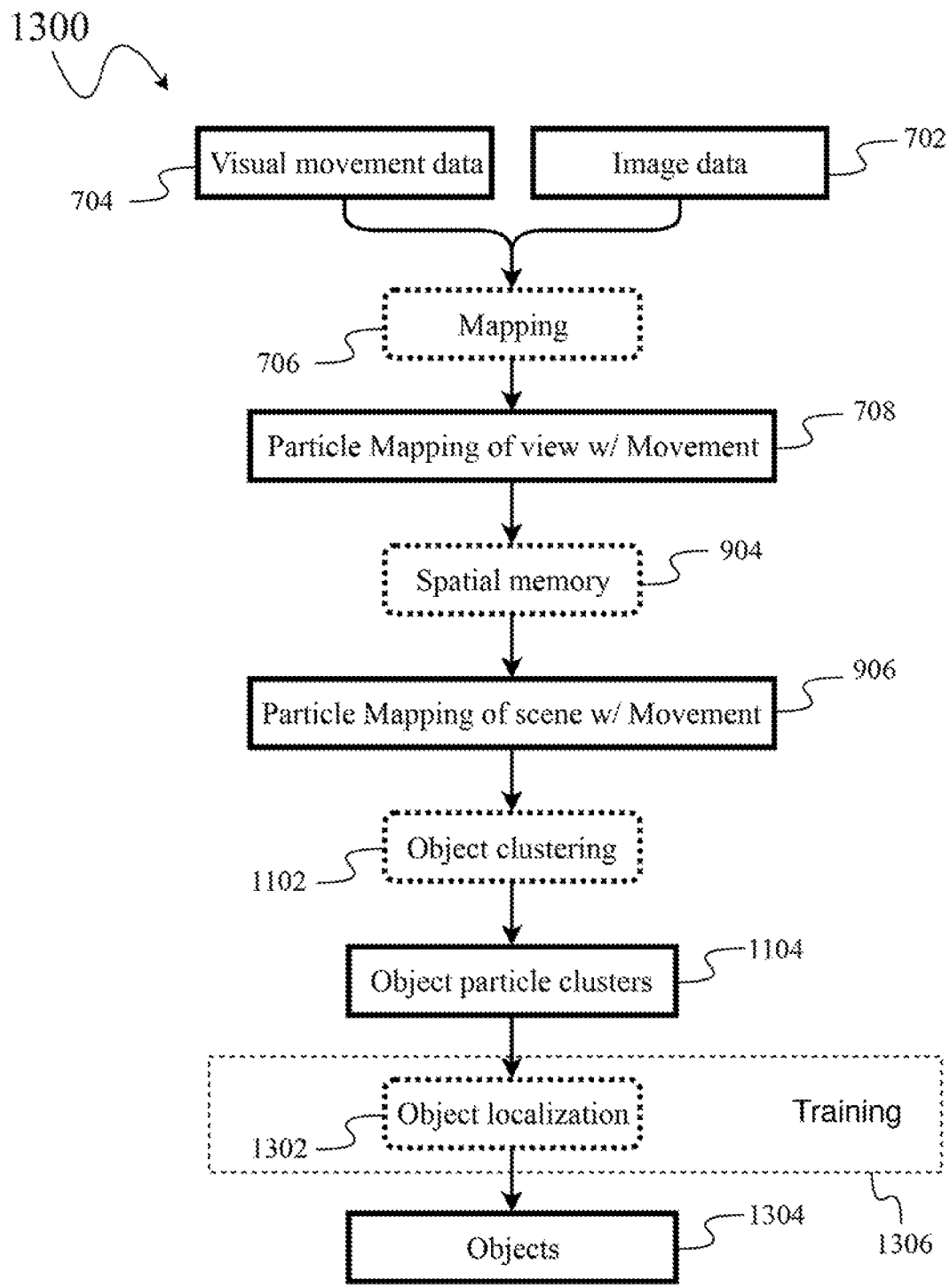
FIG. 13 is a data flow diagram of a neural network system during execution of a train for object localization method, according to at least one illustrated implementation.

FIG. 13 shows an overview of a simplified example of operation of an overall neural network system 1300 during execution of the object localization training method 1200 of FIG. 12.

A set of image data 702 of a view of a scene and a set of associated visual movement data 704 is coupled into a mapping NN topology 706. The output of the mapping NN topology 706 is a set of point cloud mappings of the provided views 708 along with associated movement information.

The set of point cloud mappings of the provided views 708 is coupled to the spatial memory system 904. The output of the spatial memory system is a set of point cloud mappings of the scene 906 having movement information.

The set of point cloud mappings of the scene 906 are coupled as input to an input layer of an object clustering NN topology 1102, which returns a set of output object particle clusters 1104 via an output layer thereof. The object clustering NN topology 1102 is in the process of undergoing a neural network training procedure 1106.

The set of output object particle clusters 1104 are coupled to the input layer of an object localization NN topology 1302, which returns a set of output object data 1304 via an output layer thereof. The object localization NN topology 1302 is in the process of undergoing a neural network training procedure 1306.

FIG. 14 shows a system deployment method 1400 operable to deploy a system, according to at least one illustrated implementation. The system deployment method 1400 may be performed as part of executing the neural network module generation method 400 (FIG. 4).

The system deployment method 1400, in part, deploys the created or generated neural network system to a robotic system (e.g., to a control system of a robot, e.g., with a robotic appendage and/or autonomous vehicle). The system deployment method 1400 may implement all or a portion of deploying system 416 of the neural network module generation method 400 (FIG. 4). Various acts of method 1400 are optional, and may be performed in a different order than presented.

The system deployment method 1400 starts at 1401. For example, the system deployment method 1400 may start in response to a call or invocation from a calling routine or program.

At 1402, the processor-based system packages the NN system for deployment. This may include finalizing the neural weights, removing code relating to training and evolution, and compiling the NN system for faster operation.

At 1404, the processor-based system installs or otherwise provides the NN system in or to an operating system or nontransitory processor-readable media of a robotic system.

At 1406, the processor-based system couples output from one or more sensors (e.g., cameras) of the robotic system as input to an input layer of the NN system.

After processing input to produce output, the system deployment method may terminate at 1420, until invoke again.

Figure 15:
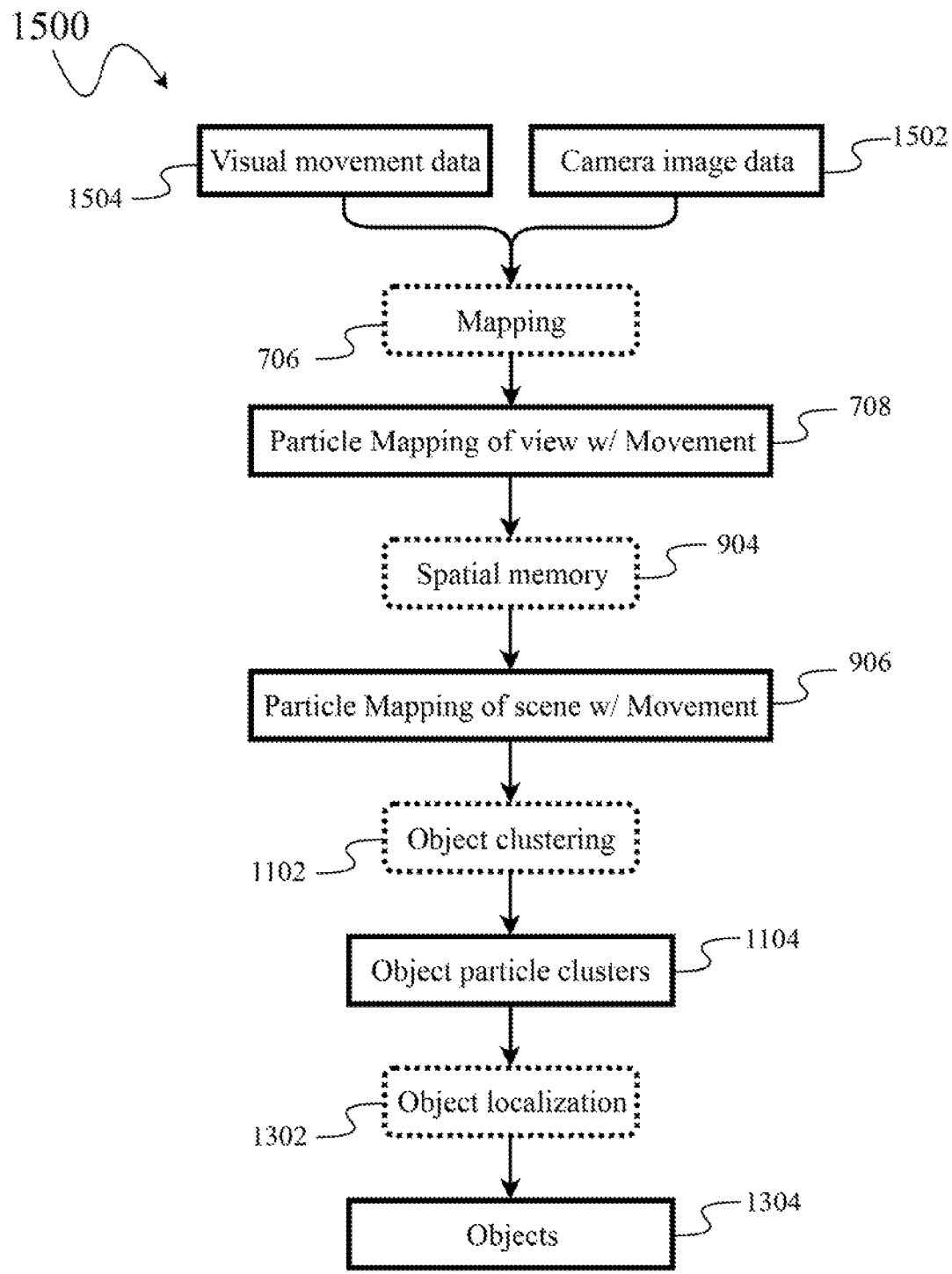
FIG. 15 is a data flow diagram of a neural network system after execution of the deploy method, according to at least one illustrated implementation, that may be executed as part of execution of the method of FIG. 10.

FIG. 15 shows an overview of a simplified example of operation of a neural network system 1500 after execution of system deployment method 1400 of FIG. 14.

A set of camera image data 1502 of a view of a scene and a set of associated visual movement data 1504 is coupled as input to an input layer of a mapping NN topology 706. An output layer of the mapping NN topology 706 provides as output a set of point cloud mappings of the provided views 708 along with associated movement or motion information.

The set of point cloud mappings of the provided views 708 is coupled to the spatial memory system 904. The output of the spatial memory system is a set of point cloud mappings of the scene 906 along with associated movement or motion information.

The set of point cloud mappings of the scene 906 are coupled to as input to an input layer of an object clustering NN topology 1102, which returns a set of output object particle clusters 1104 as output via an output layer thereof. The object clustering NN topology 1102 is in the process of undergoing a neural network training procedure 1106.

The set of output object particle clusters 1104 are coupled as input to an input layer of an object localization NN topology 1302, which returns a set of output object data 1304 as output via an output layer thereof.

The various implementations and embodiments described above can be combined to provide further implementations and embodiments. All of the commonly assigned US patent application publications, US patent applications, foreign patents, and foreign patent applications referred to in this specification and/or listed in the Application Data Sheet, including but not limited U.S. patent application 62/927,485 filed Oct. 29, 2019, are each incorporated herein by reference, in their entirety. Various changes can be made to the implementations and embodiments in light of the above-detailed description. For example, the described methods may include additional acts, omit some acts, and/or perform acts in a different order. Various methods or operations may be performed across multiple processors, which may be in a distributed environment. Various machine-learning or artificial intelligence techniques and/or data structures may be employed. As used herein and in the claims, references to random or randomized typically refer to a random or pseudo-random selection of a value from a defined set of values or random or pseudo-random generation of a value from a defined range of values, unless expressly limited otherwise. For example, a random pose may be selected from a set of possible poses, which is composed of reasonable poses, that is poses that represent a reasonable set of poses for the given object or structure (e.g., position and/or orientation of cameras and field-of-view of cameras that would, for instance mimic a view point of a human). For example, a random pose may be generated from a range of possible poses, which is encompasses reasonable poses, that is poses that represent a reasonable set of poses for the given object or structure (e.g., position and/or orientation of cameras and field-of-view of cameras that would, for instance mimic a view point of a human). Likewise a random position and/or orientation of a virtual object may be selected from a set of possible positions and/or orientations, which is composed of reasonable positions and/or orientations, that is positions and/or orientations that represent a reasonable set of positions and/or orientations for the given object or structure (e.g., position and/or orientation that does not defy laws of physics, object supported by another object, two objects do not occupy the same volume or portion thereof). Similarly, a random position and/or orientation of a virtual object may be generated from a range of possible positions and/or orientations, which encompasses reasonable positions and/or orientations, that is positions and/or orientations that represent a reasonable set of positions and/or orientations for the given object or structure (e.g., position and/or orientation that does not defy laws of physics, object supported by another object, two objects do not occupy the same volume or portion thereof). Likewise a random velocity vector associated with a virtual object may be selected from a set of possible velocity vectors, which is composed of reasonable velocity vectors, that is velocity vectors that represent a reasonable set of velocities for the given object or structure (e.g., magnitude and direction that does not defy laws of physics, or are within some expected limits of physical objects which the virtual objects simulate). Similarly, a random velocity vector associated with a virtual object may be generated from a range of possible velocity vectors, which encompasses reasonable velocities, that is magnitudes and directions that represent a reasonable range of magnitudes and directions for the given object or structure (e.g., magnitude and direction that does not defy laws of physics, or are within some expected limits of physical objects which the virtual objects simulate). These and other changes can be made to the implementations and embodiments in light of the above-detailed description.

In general, in the following claims, the terms used should not be construed to limit the claims to the specific implementations and embodiments disclosed in the specification and the claims, but should be construed to include all possible implementations and embodiments along with the full scope of equivalents to which such claims are entitled. Accordingly, the claims are not limited by the disclosure.

The invention claimed is:

1. A method to implement a visual object parsing system, the method comprising:

generating a first neural network system comprising a plurality of first neural networks, each of the plurality of first neural networks having a first neural network input, a first neural network output, and a unique set of first neural network weights;

generating a second neural network system comprising a plurality of second neural networks, each of the plurality of second neural networks having a second neural network input, a second neural network output, and a unique set of second neural network weights;

training the plurality of first neural networks to each output a first set of point cloud mappings at the respective first neural network output, wherein the first neural networks are trained with a first training dataset comprising a set of image information representing a view of a scene and a set of visual movement information associated with the view of the scene;

selecting one of the first neural networks based on a first set of criteria;

coupling the first neural network output of the selected first neural network to an input of a spatial memory system, wherein the spatial memory system integrates the first set of point cloud mappings outputted by the selected first neural network over time into a second set of point cloud mappings using position and orientation information associated with the view of the scene;

training the plurality of second neural networks to each output a set of object clusters at the respective second neural network output, wherein the second neural networks are trained with a second training dataset comprising the second set of point cloud mappings outputted by the spatial memory system; and selecting one of the second neural networks based on a second set of criteria, wherein an object parsing output representing at least one three-dimensional object is generated based at least in part on the set of object clusters outputted by the selected second neural network.

2. The method of claim 1, further comprising:
generating a plurality of digital three-dimensional scenes having distributed therein a plurality of objects;
rendering a plurality of digital images of each of the plurality of digital three-dimensional scenes from a plurality of viewpoints of the digital three-dimensional scene; and
generating the set of image information for the first training dataset at least in part with the plurality of digital images.

3. The method of claim 2, wherein generating the plurality of digital three-dimensional scenes comprises pseudo-randomly generating the digital three-dimensional scenes.

4. The method of claim 2, further comprising, prior to rendering the plurality of digital images, applying simulated forces to the plurality of objects to cause one or more of the objects to move within at least one of the digital three-dimensional scenes.

5. The method of claim 4, further comprising generating the set of visual movement of the first training dataset at least in part with visual movement information representing movement of the one or more objects within the at least one of the digital three-dimensional scenes.

6. The method of claim 2 5, wherein training the plurality of first neural networks comprises:
extracting real three-dimensional depth mapping data from each of the plurality of digital three-dimensional scenes from each of the plurality of viewpoints;
applying the first training dataset to each of the first neural network inputs to obtain a first set of output data at the respective first neural network output;
comparing the first set of output data from each of the first neural network outputs to the real three-dimensional depth mapping data from each of the plurality of three-dimensional scenes to obtain a first error value for each of the first neural networks; and
updating the first neural network weights to reduce the first error values.

7. The method of claim 6, wherein selecting one of the first neural networks based on the first set of criteria comprises selecting one of the first neural networks having a first error value below a respective threshold.

8. The method of claim 7, wherein training the plurality of second neural networks comprises:
extracting real object cluster data from each of the three-dimensional scenes from each of the plurality of viewpoints;
applying the second training dataset to each of the second neural network inputs to obtain a second set of output data at the respective second neural network output;
comparing the second set of output data from each of the second neural network outputs to the real object cluster data from each of the plurality of three-dimensional scenes to obtain a second error value for each of the second neural networks; and
updating the second neural network weights to reduce the second error values.

9. The method of claim 8, further comprising:
extracting real object data from each of the three-dimensional scenes from each of the plurality of viewpoints;
generating a third neural network system comprising a plurality of third neural networks, each third neural network having a third neural network input, a third neural network output, and a unique set of third neural network weights;
selecting one of the second neural networks having a second error value below a respective threshold;
generating a third training dataset based at least in part on the second set of output data from the selected second neural network;
applying the third training dataset to each of the third neural network inputs to obtain a third set of output data at the respective third neural network output;
comparing the third set of output data from each of the third neural network outputs to the real object data from each of the plurality of three-dimensional scenes to obtain a third error value for each of the third neural networks; and
updating the third neural network weights to reduce the third error values.

10. The method of claim 9, further comprising:
selecting one of the third neural networks having a third error value below a respective threshold; and
generating the object parsing output with the third set of output data from the output of the selected third neural network.

11. The method of claim 1, wherein training the plurality of first neural networks comprises evolving the plurality of first neural networks through one or more of neuroevolution, gradient descent, genetic evolution, or genetic programming.

12. The method of claim 1, wherein training the plurality of second neural networks comprises evolving the plurality of second neural networks through one or more of neuroevolution, gradient descent, genetic evolution, or genetic programming.

13. The method of claim 1, further comprising:
generating a third neural network system comprising a plurality of third neural networks, each of the plurality of third neural networks having a third neural network input, a third neural network output, and a unique set of third neural network weights;
training the plurality of third neural networks to each output a set of object data representing object entities within the scene, wherein the third neural networks are trained with a third training dataset comprising the set of object clusters outputted by the selected second neural network;
selecting one of the sets of object data based on a third set of criteria; and
generating the object parsing output with the selected set of object data.

14. A robotic system comprising:
at least one camera;
a visual object parsing system comprising:
a first neural network system comprising a plurality of first neural networks, each of the plurality of first neural networks having a first neural network input, a first neural network output, and a unique set of first neural network weights;
a second neural network system comprising a plurality of second neural networks, each of the plurality of second neural networks having a second neural network input, a second neural network output, and a unique set of second neural network weights; and a spatial memory system having an input coupled to an output layer of the first neural network system and an output coupled to an input layer of the second neural network system;

one or more processors; and memory storing computer-readable instructions that, when executed by the one or more processors, cause the visual object parsing system to perform operations comprising:

generating a first training dataset comprising a set of image information representing a view of a scene and a set of visual movement information associated with the view of the scene based at least in part on an output of the at least one camera;

training the plurality of first neural networks to each output a first set of point cloud mappings, wherein the first neural networks are trained with the first training dataset;

selecting one of the first neural networks based on a first set of criteria;

coupling the first neural network output of the selected first neural network to the input of the spatial memory system, wherein the spatial memory system integrates the first set of point cloud mappings outputted by the selected first neural network over time into a second set of point cloud mappings using position and orientation information associated with the view of the scene;

training the plurality of second neural networks to each output a set of object clusters at the respective second neural network output, wherein the second neural networks are trained with a second training dataset comprising the second set of point cloud mappings outputted by the spatial memory system; and selecting one of the second neural networks based on a second set of criteria, wherein an object parsing output representing at least one three-dimensional object is generated based at least in part on the set of object clusters outputted by the selected second neural network.

15. The robotic system of claim 14, the visual object parsing system further comprises a third neural network system comprising a plurality of third neural networks, each of the plurality of third neural networks having a third neural network input, a third neural network output, and a unique set of third neural network weights;

wherein the operations performed by the visual object parsing system further comprise:

training the plurality of third neural networks to each output a set of object data representing object entities within the scene, wherein the third neural networks are trained with a third training dataset comprising the set of object clusters outputted by the selected second neural network;

selecting one of the sets of object data based on a third set of criteria; and generating the object parsing output with the selected set of object data.

16. One or more non-transitory computer-readable storage media storing computer-executable instructions that when executed perform operations comprising:

generating a first neural network system comprising a plurality of first neural networks, each of the plurality of first neural networks having a first neural network input, a first neural network output, and a unique set of first neural network weights;

generating a second neural network system comprising a plurality of second neural networks, each of the plurality of second neural networks having a second neural network input, a second neural network output, and a unique set of second neural network weights;

training the plurality of first neural networks to each output a first set of point cloud mappings at the respective first neural network output, wherein the first neural networks are trained with a first training dataset comprising a set of image information representing a view of a scene and a set of visual movement information associated with the view of the scene;

selecting one of the first neural networks based on a first set of criteria;

coupling the first neutral network output of the selected first neural network to an input of a spatial memory system, wherein the spatial memory system integrates the first set of point cloud mappings outputted by the selected first neural network over time into a second set of point cloud mappings using position and orientation information associated with the view of the scene;

training the plurality of second neural networks to each output a set of object clusters at the respective second neural network output, wherein the second neural networks are trained with a second training dataset comprising the second set of point cloud mappings having movement information outputted by the spatial memory system; and selecting one of the second neural networks based on a second set of criteria, wherein an object parsing output representing at least one three-dimensional object is generated based at least in part on the set of object clusters outputted by the selected second neural network.

* * * * *